US012785390B1

(12) United States Patent
Gulzar et al.

(10) Patent No.: US 12,785,390 B1
(45) Date of Patent: Nov. 3, 2026

(54) HYBRID PREDICTIVE AND OBSERVER-BASED FREQUENCY CONTROL SYSTEM FOR SMART INTERCONNECTED POWER GRIDS

(71) Applicant: King Fahd University of Petroleum and Minerals, Dhahran (SA)

(72) Inventors: Muhammad Majid Gulzar, Dhahran (SA); Salman Habib, Dhahran (SA); Adnan Shakoor, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/456,092

(22) Filed: Jan. 22, 2026

(51) Int. Cl.
*H02J 3/0014* (2026.01)
*G05B 19/048* (2006.01)
*H02J 3/38* (2026.01)
*H02J 101/24* (2026.01)
*H02J 101/28* (2026.01)
*H02J 101/30* (2026.01)

(52) U.S. Cl.
CPC ........ *H02J 3/00142* (2026.01); *G05B 19/048* (2013.01); *H02J 3/381* (2013.01); *G05B 2219/39222* (2013.01); *G05B 2219/42061* (2013.01); *H02J 2101/24* (2026.01); *H02J 2101/28* (2026.01); *H02J 2101/30* (2026.01)

(58) Field of Classification Search
None
See application file for complete search history.

(56) References Cited

U.S. PATENT DOCUMENTS

2009/0143871 A1 6/2009 Gao et al.
2012/0283850 A1* 11/2012 Gao .................... G05B 13/048 700/45
2014/0152009 A1* 6/2014 Meisner .................... H02P 9/04 290/7
2016/0170384 A1 6/2016 Charest-Finn et al.
2025/0192568 A1 6/2025 Gulzar et al.

FOREIGN PATENT DOCUMENTS

CN 114725951 A * 7/2022 .......... H02J 3/00142

OTHER PUBLICATIONS

MV Mahendran, et al., "Model-predictive control-based hybrid optimized load frequency control of multi-area power systems", IET Generation, Transmission & Distribution, vol. 15, Issue 9, May 2021 (first published Feb. 8, 2021), pp. 1521-1537.

* cited by examiner

*Primary Examiner* — Menatoallah Youssef
*Assistant Examiner* — Aqeel H Bukhari
(74) *Attorney, Agent, or Firm* — Oblon, McClelland, Maier & Neustadt, L.L.P.

(57) ABSTRACT

A hybrid frequency control system for interconnected power grids, having a 2 degree of freedom model predictive controller, a linear active disturbance rejection controller, and a signal combiner. The 2DoF-MPC receives area control error and load perturbation signals to generate a first control signal, while the LADRC estimates and rejects internal and external disturbances to generate a second control signal. The two signals are combined by the signal combiner to produce a unified control output for frequency regulation. The hybrid system controls frequency oscillations in power grids with renewable energy sources, energy storage systems, and flexible AC transmission system (FACTS) devices.

20 Claims, 26 Drawing Sheets

HYBRID PREDICTIVE AND OBSERVER-BASED FREQUENCY CONTROL SYSTEM FOR SMART INTERCONNECTED POWER GRIDS

STATEMENT OF PRIOR DISCLOSURE BY AN INVENTOR

Aspects of the present disclosure are described in Muhammad Majid Gulzar, "Frequency handling by reinforcement of predictive 2DoF-MPC and state observer LADRC for smart power system," ISA Transactions, Volume 165 (2025), Pages 128-142, which is incorporated herein by reference in its entirety.

STATEMENT OF ACKNOWLEDGEMENT

Support provided by the King Fahd University of Petroleum and Minerals (KFUPM). The author at KFUPM acknowledges the Interdisciplinary Research Center for Sustainable Energy Systems (IRC-SES) is gratefully acknowledged.

BACKGROUND

Technical Field

The present disclosure is directed to a hybrid frequency control, and more specifically to a system and method for hybrid frequency control for interconnected power grids.

Description of Related Art

The "background" description provided herein is for the purpose of generally presenting the context of the disclosure. Work of the presently named inventors, to the extent it is described in this background section, as well as aspects of the description which may not otherwise qualify as art at the time of filing, are neither expressly or impliedly admitted as art against the present disclosure.

The rapid expansion of industrial sectors and the accelerated pace of urbanization have resulted in a significant and continual rise in electrical energy demand. To accommodate this increasing demand, electrical power generation capacities have been expanded considerably. However, the reliable delivery of the generated power to end users depends heavily on the stability and efficiency of power transmission networks. The interconnected structure of modern power transmission lines is expected to achieve consistent, uninterrupted, and dependable power transfer across various load centers. In practice, however, the operation of these systems often encounters dynamic variations in system parameters, which may induce operating instability.

If such instability events in a power system (PS) are not addressed appropriately, they may threaten the operational continuity and structural reliability of power network infrastructures. This can manifest as frequent voltage dips, frequency oscillations, power imbalance conditions, and in severe cases, cascading failures that may lead to widespread blackouts and equipment damage. The mechanism that governs the balancing of system frequency with tie-line power exchange across interconnected areas is referred to as Load Frequency Control (LFC). Under normal conditions, any deviation of load or generation triggers corrective actions to restore system frequency to its nominal value. When disturbances occur, for examples, sudden load changes, generation outages, or tripping of system components, the system must return to steady-state equilibrium efficiently to prevent outage propagation.

The increasing penetration of renewable energy sources (RES) such as wind and solar in modern power grids further introduces variability and uncertainty in net power output. Environmental fluctuations, intermittent renewable availability, and stochastic variations in demand profiles contribute to frequency deviations within interconnected power systems (IPS). These challenges emphasize the necessity of ensuring power system stability, particularly during transient events such as line faults, overloading, and generator outages. Moreover, the presence of multiple independent power producers (IPPs) with limited inherent frequency regulation capabilities aggravates system dynamic response issues. Under such circumstances, conventional frequency control mechanisms, including primary governor control, often fail to sufficiently damp transient frequency fluctuations (TFF), thereby necessitating faster and more adaptive stabilization methods.

To address these challenges, Flexible AC Transmission System (FACTS) devices have been increasingly proposed for dynamic power system stabilization. Among these devices, the Static Synchronous Series Compensator (SSSC) is recognized for its capability to dynamically regulate power flow, enhance power transfer capability, and mitigate oscillatory behavior in transmission networks. Additionally, damping of low-frequency oscillations (LFOs) is considered critical in maintaining stable power transfer between generating units and load centers. Power System Stabilizers (PSS) are conventionally employed to generate supplementary stabilizing signals for improving the damping characteristics of multi-machine power systems (MMPS) and single-machine infinite-bus (SMIB) networks. However, the nonlinear characteristics of modern power systems reduce the effectiveness of traditional PSS that are typically designed based on linearized operating points, thus limiting their stabilizing performance under wide-area disturbances and dynamic operating conditions.

Low-frequency oscillations in power systems are generally classified into local oscillations, where a single generator oscillates relative to the rest of the system, and inter-area oscillations, which involve groups of generators oscillating against other regions. Effective supplementary control strategies are therefore necessary to suppress LFOs, restore rotor-angle synchronism, and maintain continuous power delivery to critical loads. Conventional PSSs have been widely applied for damping oscillations in both SMIB and MMPS configurations. However, under conditions of long-distance power transfer and inter-area oscillations, PSS alone often becomes insufficient. In such cases, combined deployment of PSS and FACTS-based Power Oscillation Damping (POD) controllers has been shown to provide enhanced damping improvement. Maintaining system robustness against frequency oscillations is therefore vital for reliable grid operation.

Several classical and modern control strategies have been proposed for LFC in single-area and multi-area power systems. Numerous approaches utilize proportional-integral-derivative (PID) controllers, advanced tuning methodologies, fractional-order control, and robust compensation techniques. With the increasing reliance on renewable resources, control strategies such as Model Predictive Control (MPC) have been introduced to address the challenges of intermittency and time-varying system dynamics.

In addition, control methodologies employing state observers have received considerable focus owing to their capability to adapt to varying operating conditions and effectively suppress external disturbances. Among these, Active Disturbance Rejection Control (ADRC) and its variants-such as Linear ADRC (LADRC), Generalized ADRC (GADRC), and Reduced-Order ADRC schemes—have been widely implemented in industrial power networks to improve dynamic stability in the presence of parameter uncertainties and random fluctuations. Despite the demonstrated advantages of these advanced control strategies in specific scenarios, the development of a cohesive control framework that simultaneously ensures high robustness, fast transient response, and low computational complexity in hybrid power system (UPS) environments remains insufficient. This gap underscores the necessity for advanced control solutions capable of delivering superior dynamic performance in interconnected and renewable-rich power systems.

Each of the aforementioned references addressed different aspects of load frequency control, including model predictive control, for example, distributed MPC, adaptive MPC, and target-adjusted MPC, the MPC-1+PIDN, the MPC-FOPIDN, the ADRC, the LADRC, the GADRC, and reduced-order ADRC. While these references contributed foundational strategies for load frequency control, they often relied on implementing many variants and strategies. Many approaches were complicated and required multiple turning settings by employing the ESO, the tracking differentiator and the error-estimated state feedback controller.

Accordingly, it is one object of the present disclosure to provide a control mechanism that effectively reduces frequency disruption in the hybrid power system (HPS). The system combines predictive and state estimation to improve HPS's performance. The reinforcement-based 2-DoF-MPC ameliorates the output performance of the LFC system in conjunction with LADRC as state feedback to enhance the control output of the controller. Parametric variation, uncertainties and disturbances in the HPS. The HPS system accumulates photovoltaic (PV), wind, energy storage system (ESS) and thermal power system (PS) to validate the effectiveness of the multi-area power system.

SUMMARY

In an exemplary embodiment, a hybrid frequency control system for interconnected power grids is described. The hybrid frequency control system comprises a 2 degree of freedom model predictive controller (2DoF-MPC) configured to receive area control error (ACE) and load perturbation signals and generate a first control signal based on predictive control algorithms. A linear active disturbance rejection controller (LADRC) is configured to estimate and reject internal and external disturbances in the power grid and generate a second control signal. A signal combiner is configured to combine the first control signal and the second control signal to produce a unified control output for frequency regulation of the interconnected power grid.

In another exemplary embodiment, a method for hybrid frequency control in interconnected power grids is described. The method comprises receiving area control error (ACE) and load perturbation signals from the interconnected power grid. The method comprises generating a first control signal using a 2 degree of freedom model predictive control (2DoF-MPC) algorithm that processes the ACE and load perturbation signals. The method comprises generating a second control signal using a linear active disturbance rejection control (LADRC) algorithm that estimates and compensates for system disturbances. The method comprises combining the first control signal and the second control signal to produce a unified control output. The method comprises applying the unified control output to load frequency control systems for frequency regulation of the interconnected power grid.

In yet another exemplary embodiment, a non-transitory computer-readable medium storing instructions that, when executed by a processor, cause the processor to perform operations that comprise receiving area control error (ACE) and load perturbation signals from an interconnected power grid. The processor executes a 2 degree of freedom model predictive control (2DoF-MPC) algorithm to generate a first control signal based on the ACE and load perturbation signals. The processor executes a linear active disturbance rejection control (LADRC) algorithm to generate a second control signal that estimates and compensates for system disturbances. The processor combines the first control signal and the second control signal to produce a unified control output and transmit the unified control output to load frequency control systems for frequency regulation of the interconnected power grid.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
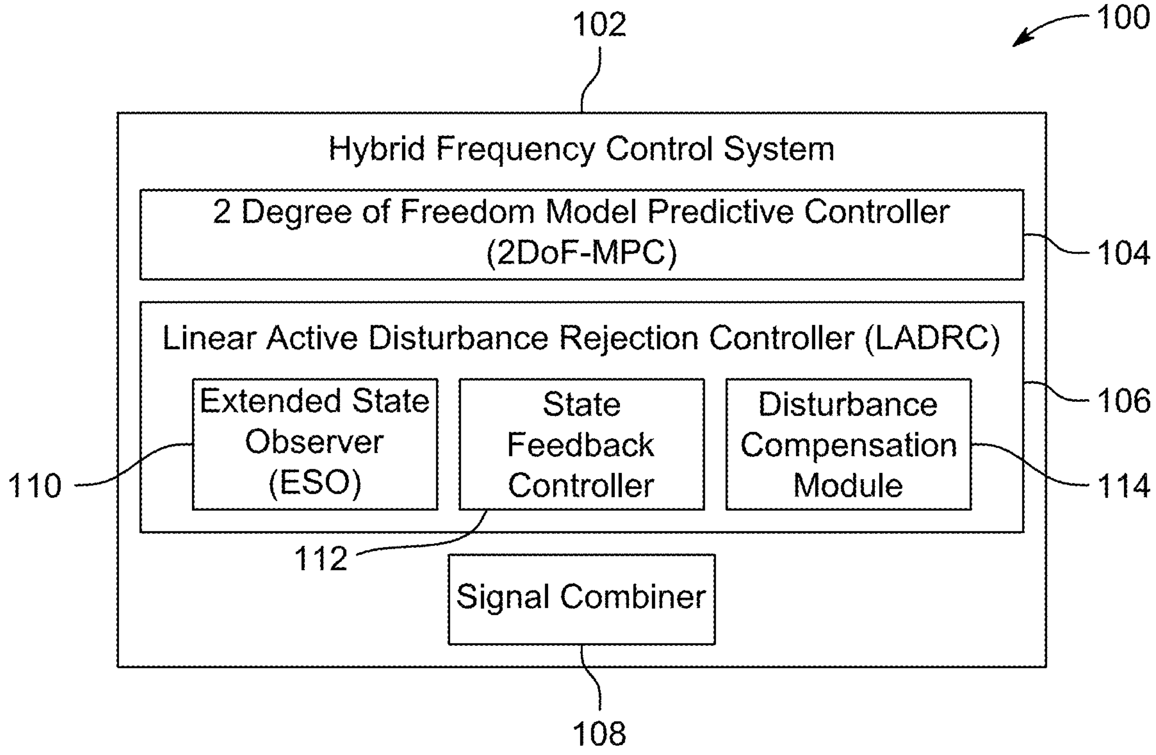
FIG. 1 illustrates an exemplary block diagram of a hybrid frequency control system for interconnected power grids, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the present disclosure are directed to a hybrid predictive and observer-based frequency control system for smart interconnected power grids. Conventional frequency control techniques often struggle to deal with the fluctuations and intermittent nature of renewable energy sources (RES) and load frequency control (LFC). Moreover, these techniques fail to withstand parameter changes and random load disturbances. Further, the conventional techniques lack the ability to effectively reduce frequency disruptions in the hybrid power system (HPS).

The present disclosure describes an efficient frequency control management (FCM) that integrates a 2 degree of freedom-based model predictive controller (2DoF-MPC) and a linear active disturbance rejection control (LADRC) to employ a state observer. The convergence of the predictive and state observer frameworks results in a robust 2DoF-MPC-LADRC to manage frequency disturbances and uncertainties in the power system. The frequency output is regulated effectively by including renewable energy sources (RESs), redox flow battery (RFB), and static synchronous series compensator (SSSC). Parametric variation, uncertainties and disturbances are handled in the HPS. The HPS accumulates photovoltaic (PV), wind, energy storage system (ESS), and thermal power system (PS) to validate the effectiveness of the controller for multi-area PS.

FIG. 1 illustrates an exemplary block diagram of a hybrid frequency control system for interconnected power grids, according to certain embodiments.

The hybrid frequency control system for interconnected power grids comprises a 2 degree of freedom model predictive controller (2DoF-MPC), a linear active disturbance rejection controller (LADRC), and a signal combiner.

Figure 2:
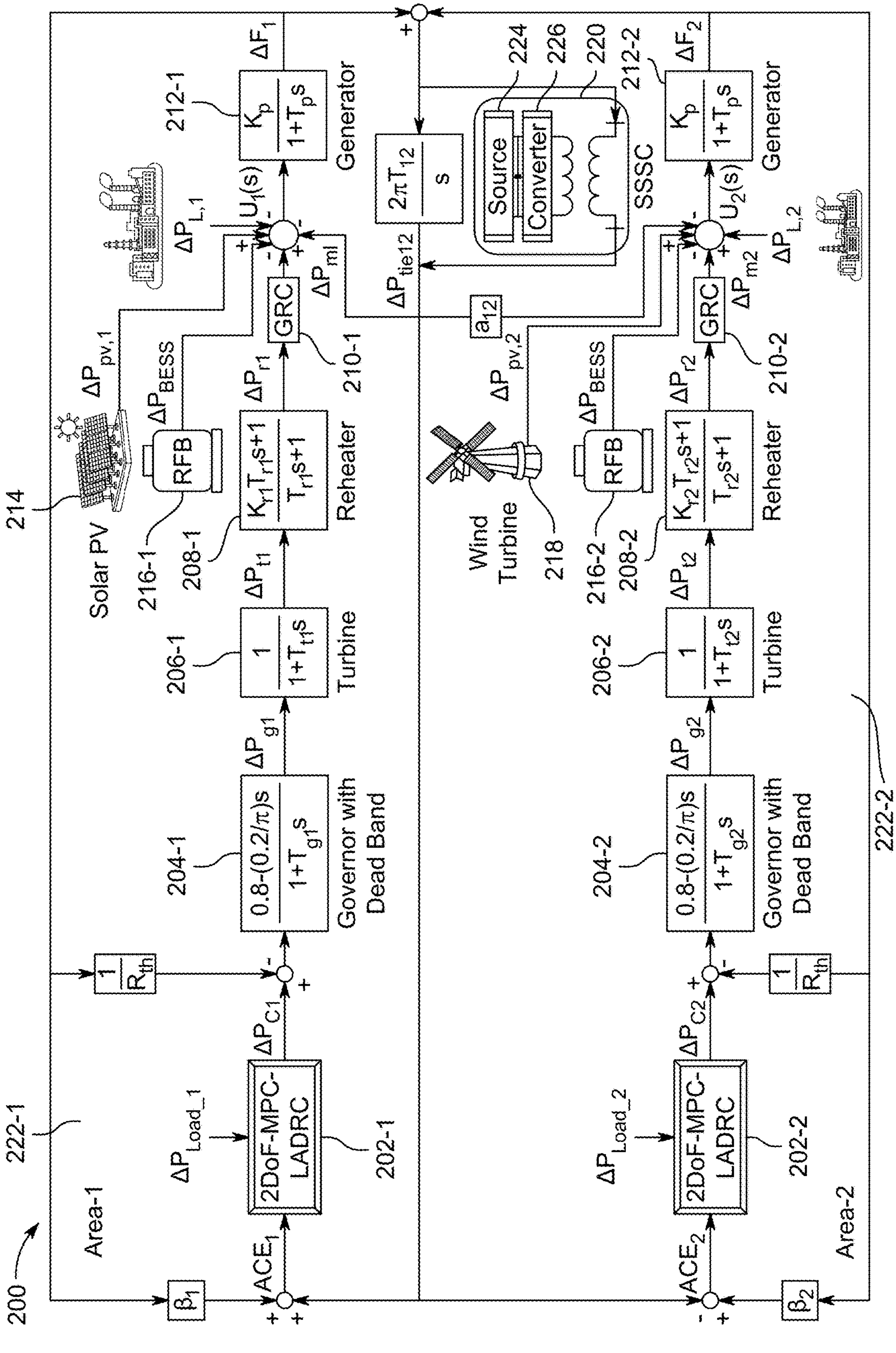
FIG. 2 illustrates an exemplary schematic representation of an interconnected two-area hybrid model with a static synchronous series compensator (SSSC), according to certain embodiments.

In an aspect, the 2DoF-MPC is implemented for coordinated regulation of frequency and tie-line power flows in the interconnected power grids that comprise one or more control areas (Area-1 222-1 and Area-2 222-2, as shown in FIG. 2). The 2DoF-MPC is configured to receive area control error (ACE) and load perturbation signals. In an aspect, the ACE signals refer to a composite control parameter used to quantify the instantaneous imbalance with the control areas (Area-1 and Area-2) of the interconnected power grids. The ACE represents a weighted summation of frequency deviation and tie-line power deviation with respect to their respective nominal operating values. The ACE serves as feedback input to load frequency control (LFC), enabling the controller to restore system frequency and inter-area power to reference values following disturbances (e.g., load variations, renewable generation fluctuations). The ACE is used as a metric for evaluating and correcting imbalances, ensuring the coordinated and stable operation of interconnected power grids. In one aspect, the load perturbation signal refers to a time-varying deviation in power demand that occurs in the control areas. The perturbation occurs due to fluctuations, but not limited to, usage patterns, loads, intermittent generation from renewable energy resources, or switching events.

In an aspect, the 2DoF-MPC is configured to process the ACE and load perturbation signals using a prediction horizon and control horizon to optimize future control actions.

The 2DoF-MPC is configured to generate a first control signal based on predictive control algorithms. In an aspect, the predictive control algorithms may employ a mathematical model to predict the first control signal (e.g., system state) over a defined prediction interval and subsequently determine an optimal control action by minimizing a predefined cost function subject to operational and system constraints.

In an aspect, the LADRC comprises an extended state observer (ESO), a state feedback controller, and a disturbance compensation module. The LADRC is configured to estimate and reject internal and external disturbances in the power grid and generate a second control signal using the ESO, the state feedback controller and the disturbance compensation module.

In an aspect, the ESO may concurrently estimate the system states and disturbances, for example, uncertainties in parameters, load variations, renewable generation intermittency and coupling effects between control areas. In an operative aspect, the ESO estimates both measured and unmeasured disturbances affecting the power grid. The ESO reformulates the system dynamics by incorporating a supplementary state variable that represents disturbances affecting the power grid. The ESO continuously refines the disturbance estimate by evaluating the error between the actual output signal and the estimated output generated by the observer. Through the real-time estimation and the disturbance rejection capability, the ESO facilitates active compensation of internal and external disturbances, thereby isolating the system from uncertainty effects. This ensures robustness, faster dynamic response and stable control performance across varying operating conditions.

The state feedback controller of the LADRC is configured to generate control signals based on estimated states. In an operative aspect, the state feedback controller generates the control signals based on estimated states of the ESO. The state feedback controller may use the estimated states of the ESO to generate the control signals. As the ESO provides the estimated system states in real time, the state feedback controller generates the control signals using accurate and updated system information (i.e., estimated system states in real time). By using the estimated system states, the state feedback controller generates the control signals to regulate the output of the system towards the desired reference.

The disturbance compensation module of the LADRC is configured to actively reject estimated disturbances. The disturbances compensation module may process the estimated disturbances obtained from the ESO and apply corrective action, for example, actively reject the estimated disturbances. Through the active rejection mechanism, the disturbance compensation module effectively suppresses the impact of dynamic disturbances. This ensures effective disturbance rejection, improves stability and enhances the dynamic performance of the system.

A signal combiner configured to combine the first control signal from the 2DoF-MPC and the second control signal from the LADRC to produce a unified control output for frequency regulation of the interconnected power grid. The signal combiner is configured to weight the first control signal and the second control signal based on system operating conditions. The system operating conditions may comprise, but are not limited to, variation in renewable power output, load demand fluctuations, grid frequency deviations, tie-line power flow fluctuations, fault or disturbance events and energy storage state variations. In an aspect, the signal combiner may apply an adaptive weighting strategy that is dynamically varied in accordance with the system operating conditions. The signal combiner combines the first control signal and the second control signal to produce the unified control output based on the applied adaptive weighting strategy. By employing such adaptive weighting, coordinated control action is achieved, ensuring reliable and continuous system operation across diverse load variations, renewable generation fluctuations, and other dynamic operating scenarios.

In an aspect, the system is configured to control frequency oscillations in a power grid comprising renewable energy sources, energy storage systems, and flexible AC transmission system (FACTS) devices. In an aspect, the renewable energy sources comprise photovoltaic (PV) systems and wind turbine generators. The energy storage systems comprise redox flow battery (RFB) systems. The FACTS devices comprise static synchronous series compensators (SSSC).

The system 102 is configured to operate in a multi-area interconnected power grid with tie-line power flow control. In an operative aspect, the hybrid frequency control system 102 operates in two areas, i.e., Area-1 (222-1) and Area-2 (222-2), as shown in FIG. 2.

The hybrid frequency control system 102 combines predictive and state estimation to improve the power system performance. The reinforcement-based 2-DoF MPC 104 enhances the dynamic output performance of the load frequency control (LFC) system. The LADRC 106 is employed as a state-feedback mechanism to compensate for internal and external disturbances. The cooperative integration of the 2-DoF-MPC 104 with the LADRC 106 yields enhanced control authority and precise frequency restoration. This configuration ensures improved robustness, faster convergence, and stable operational response under varying load and system conditions. The hybrid frequency control system 102 efficiently handles parametric variation, uncertainties and disturbances in the power system.

FIG. 2 illustrates an exemplary schematic representation 200 of an interconnected two-area hybrid model with a static synchronous series compensator (SSSC) 220, according to certain embodiments.

The interconnected two-area hybrid model 201 (also referred to as the continuous frequency control model for interconnected power system (IPS)) comprises Area-1 222-1 and Area-2 222-2. Each control area (i.e., Area-1 222-1, Area-2 222-2) represents an independent power generation control region of an interconnected power system. They exchange tie-line power and frequency information to maintain system-wide load balance and frequency stability. In an aspect, the IPS comprises a plurality of power-generation and energy-storage components, including, but not limited to, a residential load, a photovoltaic (PV) generation unit, a redox flow battery (RFB) system, the SSSC, and a thermal power generation unit. The IPS is configured to provide both primary and secondary frequency regulation capabilities.

The interconnected two-area hybrid model 201 comprises, in Area-1 222-1, a 2DoF-MPC-LADRC 202-1, a governor with dead band 204-1, a turbine 206-1, a reheater 208-1, a generation rate constraint (GRC) 210-1, a generator 212-1, a solar photovoltaic (PV) 214, and a Redox Flow Battery (RFB) 216-1.

The interconnected two-area hybrid model 201 comprises, in Area-2 222-2, a 2DoF-MPC-LADRC 202-2, a governor with dead band 204-2, a turbine 206-2, a reheater 208-2, a GRC 210-2, a generator 212-2, a RFB 216-2, a wind turbine 218, a static synchronous series compensator (SSSC) 220. The SSSC 220 comprises a source 224 and a converter 226.

Frequency Bias Factors ($\beta_1$ and $\beta_2$) are coefficients that represent the frequency bias settings of each control area. The frequency bias factors scale the Area Control Error (ACE) to balance generation and frequency deviations.

The Area Control Errors ($ACE_1$ and $ACE_2$) represent the real-time deviation between scheduled and actual power interchange, along with frequency deviation. The ACEs serve as a control input for secondary frequency regulation.

The load disturbances ($\Delta P_{Load\_1}$ and $\Delta P_{Load\_2}$) represent sudden or gradual variations in power demand within each area. They act as external disturbance signals that require compensation through control action.

In an aspect, 2DoF-MPC-LADRC Controller 202-1, 202-2 integrates a two-degree-of-freedom Model Predictive Control (2DoF-MPC) with Linear Active Disturbance Rejection Control (LADRC). It simultaneously predicts future control actions and suppresses internal and external disturbances to improve frequency stability.

In an aspect, the speed regulation constant ($1/R_h$) is an inverse droop or speed regulation factor that adjusts generator output in response to frequency changes. It modulates primary frequency control sensitivity.

In an aspect, the governor with a dead band 204-1, 204-2 is a governor that regulates turbine input but includes a dead-band characteristic to avoid unnecessary small control actions. This avoids actuator wear and stabilizes control signal response.

In an aspect, the turbine (1/(1+T_t s)) 206-2, 206-2 represents the mechanical power conversion dynamics from steam or hydraulic input to rotational shaft power. The time constant model's turbine inertia and response lag.

In an aspect, the reheater ($K_{r1}T_{r1}s+1/T_{r1}s+1$) 208-1, 208-2 models steam reheating effects in thermal generator systems. It slows and smooths transient turbine response to improve thermal efficiency and stability.

In an aspect, the generation rate constraint (GRC) 210-1, 210-2 limits the maximum allowable ramp rate of generator output. It ensures mechanical protection by preventing sudden large changes in power output.

In an aspect, the generator ($K_p/(1+T_p s)$) 212-1, 212-2 models the generator's electromechanical dynamics. The gain and time constant capture rotor inertia and electromagnetic delay.

In an aspect, the frequency deviations ($\Delta F_1$ and $\Delta F_2$) indicate the deviation of system frequency from nominal (e.g., 50/60 Hz). Controllers attempt to drive these deviations to zero.

In an aspect, the solar PV system 214 represents photovoltaic energy generation integrated into Area-1. Output varies with sunlight conditions and contributes to renewable power share.

In an aspect, the wind turbine system 218 represents wind-based power generation connected to Area-2. Output depends on wind speed variability and provides renewable generation support.

In an aspect, the Redox Flow Battery (RFB) (also referred to as Flow Battery Energy Storage) stores and releases electrical energy to stabilize transient frequency fluctuations. It compensates for renewable intermittency and load imbalance.

In an aspect, the Energy Storage Output Power ($\Delta P_{BESS}$) represents the power injected or absorbed by energy storage systems in each area for dynamic frequency control support.

In an aspect, the control summation node ($U_1(s)$ algebraically sums control inputs from governor, storage, renewable, and load disturbance signals to produce net mechanical power command.

In an aspect, the tie-line power flows ($\Delta PTie_{12}$) represent exchanged power between Area-1 and Area-2. They maintain inter-area energy balance and are used in ACE calculations.

In an aspect, the static synchronous series compensator (SSSC) is a flexible alternate current transmission system (FACTS) device regulating tie-line power flow by injecting a controllable series voltage. It enhances inter-area damping and improves power transfer stability.

In an aspect, during primary frequency control, a droop control mechanism is employed in conjunction with a gas turbine valve actuator to regulate active power output and establish a new steady-state operating point for system frequency following a disturbance event. However, in systems with increasing penetration of inverter-interfaced renewable energy sources (RES), a persistent imbalance between power supply and power demand arises due to the intermittent and non-synchronous characteristics of the RESs. This condition leads to reduced system inertia and introduces significant challenges in maintaining frequency stability within the grid.

Conventional power system architectures achieve frequency stabilization in response to contingency events through the inherent rotational inertia provided by synchronous generators (SGs), supplemented by power system stabilizers (PSS), damping windings, and series compensation devices such as the SSSC. The dynamic interplay among power imbalance, system inertia, damping effects, and the resulting frequency deviation is governed by the well-established swing equation, as expressed in Equation (1).

$$\Delta P_m(s)-\Delta P_{Load}(s)=2Hs\Delta F(s)+D\Delta F(s) \quad \text{Equation (1)}$$

As illustrated in Equation (1), the variables that represent changes are power ($\Delta P_m$), load ($\Delta P_{Load}$), frequency ($\Delta F$), inertia constant (H), and load-damping constant (D). Hence, the frequency control model may be used to express the frequency divergence, as shown below.

$$\Delta F = \frac{(\Delta P_m + \Delta P_{PV} + \Delta P_{Wind} - \Delta P_{BESS} - \Delta P_{SSSC} - \Delta P_{Load})}{2Hs + D} \quad \text{Equation (2)}$$

$$\Delta P_m = \frac{1}{1+sT_t}\Delta P_m \quad \text{Equation (3)}$$

$$\Delta P_g = \frac{0.8 - \left(\frac{0.2}{\pi}\right)s}{1+sT_g}\left(\Delta P_c - \Delta F\frac{1}{R}\right) \quad \text{Equation (4)}$$

$$\Delta P_{PV} = \frac{1}{1+sT_{Inv}}\Delta P_{solar} \quad \text{Equation (5)}$$

-continued $$\Delta P_{Wind} = \frac{1}{1 + sT_{inv}} \Delta P_{wind} \quad \text{Equation (6)}$$

$$G_{BESS}(s) = \frac{1}{1 + T_{BESS}.s} \quad \text{Equation (7)}$$

In an aspect, in Photovoltaic (PV) modeling convert incident solar irradiance into electrical energy through a combination of mechanical and electrical components. The PV system comprises at least one PV array and an associated power conditioning unit, such as an inverter, for converting the direct current (DC) electrical output of the PV array into alternating current (AC) suitable for grid integration. The PV system may be implemented in various scales, including large utility-scale solar power plants or compact distributed installations; however, the present disclosure pertains to grid-connected PV systems deployed within the power network. The PV array is formed from a plurality of PV cells electrically interconnected in series and/or parallel configurations to achieve a desired voltage and power rating. Each PV cell may be modeled by an equivalent electrical circuit comprising a light-generated current source ($I_{ph}$), a series resistance ($R_s$), and a shunt resistance ($R_{sh}$). Additionally, each PV cell includes an ideal diode characterized by a reverse saturation current Is, which governs the nonlinear current-voltage (I-V) behavior of the device.

Applying Kirchhoff's current law to the equivalent PV cell circuit yields the mathematical expression necessary to derive the I-V characteristic of the PV cell, as represented in Equation (8). The resulting model facilitates accurate prediction of PV array performance under varying irradiance and temperature conditions and supports system-level analysis and control of PV-integrated power grids.

$$i = I_{ph} - I_s\left[\exp\left(\frac{v + iR_s}{AVt}\right) - 1\right] - \frac{v + iRs}{R_{sh}} \quad \text{Equation (8)}$$

Where, i represents the output current, while v denotes the voltage. Parameter A represents the quality factor of the diode and is the cell temperature. K represents Boltzmann's constant, while q corresponds to the electron charge that is used to determine the thermal voltages $V_t = K_T/q$.

The currents, i.e., the electric current of the photovoltaic cell ($I_{ph}$) and the electrical current at a short-circuit temperature ($I_s$), are expressed as in Equation (9) and Equation (10)

$$I_{ph} = S[I_{SC} + K_i(T - T_{ref})] \quad \text{Equation (9)}$$

$$I_S = I_{rs} 1 + \left(\frac{T}{T_{ref}}\right)\left[\left(\frac{qEg}{KA}\frac{1}{T_{ref}} - \frac{1}{T}\right)\right] \quad \text{Equation (10)}$$

Where, $I_{SC}$ represents short-circuit current and $I_{rs}$ represents reverse saturation current at reference temperature $T_{ref}$. S stands for solar irradiation ($W/m^2$), coefficient $K_i$ denotes the temperature coefficient associated with PV cells' p-n junction characteristics, while Eg represents the energy band gap. The constants K, q, and A correspond to Boltzmann's constant, the elementary electronic charge and the diode ideality factor, respectively. The Equations (9) and (10) define the dependence of the photovoltaic cell current on variations in irradiance and temperature, enabling accurate modeling of PV behavior under dynamic environmental conditions.

In an aspect, in wind turbine modeling, the output power generated by the wind turbine is affected directly by the wind speed ($V_W$). Equation (11) demonstrates the strength Pw produced by the wind turbine.

$$\rho_{wT} = \frac{1}{2}\rho A_r C_{\rho(\gamma,\beta)} V_w^3 \quad \text{Equation (11)}$$

Where, $A_r$ represents the square meter surface area of the turbine, $V_w$ the wind speed in meters per second, and $C_P$ the power coefficient.

$A_r$ is represented by Equation (12) as follows:

$$A_r = 2\ \text{hr} \quad \text{Equation (12)}$$

In an aspect, the wind turbine generation (WTG) rate of change may be expressed as in Equation (13), $$P_{WTG} = \begin{cases} 0,\ V_{WD} < V_{cut-in} \| V_{WD} > V_{cut-out} \\ P_{rated},\ V_{rated} \le V_{WD} \le V_{cut-out} \\ (0.001312 V_{WD}^6 - 0.04603 V_{WD}^5 + 0.3314 V_{WD}^4 + \\ 3.687 V_{WD}^3),\ \text{else} \\ -51.1 V_{WD}^2 + 2.33 V_{WD} + 366 \end{cases} \quad \text{Equation (13)}$$

$$\Delta P_{WTG} = \begin{cases} 0,\ V_{WD} < V_{cut-in} \| V_{WD} > V_{cut-out} \\ 0,\ V_{rated} \le V_{WD} \le V_{cut-out} \\ (0.007872 V_{WD}^5 - 0.23015 V_{WD}^4 + 1.3256 V_{WD}^3 + \\ 11.061 V_{WD}^2) \\ -102.2 V_{WD} + 2.33].\Delta V_{WD} \end{cases} \quad \text{Equation (14)}$$

In an aspect, each control area (i.e., Area-1, Area-2) continuously measures its frequency deviation and tie-line power variation to compute the respective Area Control Error (ACE). The ACE is fed to the 2DoF-MPC-LADRC controller 202-1, 202-2, which predicts future system behavior and actively suppresses internal and external disturbances, generating an optimized secondary control signal. This signal is combined with primary frequency control from the governor 204-1, 204-2, turbine 206-1, 206-2, and reheater dynamics 208-1, 208-2, subject to Generation Rate Constraints (GRC) 210-1, 210-2, to regulate the generator mechanical power output. Simultaneously, renewable sources such as Solar PV 214 in Area-1 222-1 and Wind Turbine 218 in Area-2 222-2 supply variable power, while Redox Flow Battery storage 216-1, 216-2 provides compensatory power injections or absorption to mitigate renewable intermittency. The net power command is summed up with load disturbances and renewable fluctuations to produce the final generator input. The generator input is fed to the generator 212-1, 212-2. Both areas, Area-1 222-1, Area-2 222-2, exchange real-time power via the tie-line, where the SSSC 2220 modulates the series voltage to enhance inter-area power flow damping and stability. Through this coordinated closed-loop interaction, frequency stability and balanced power distribution are maintained under load and renewable variability.

Figure 3:
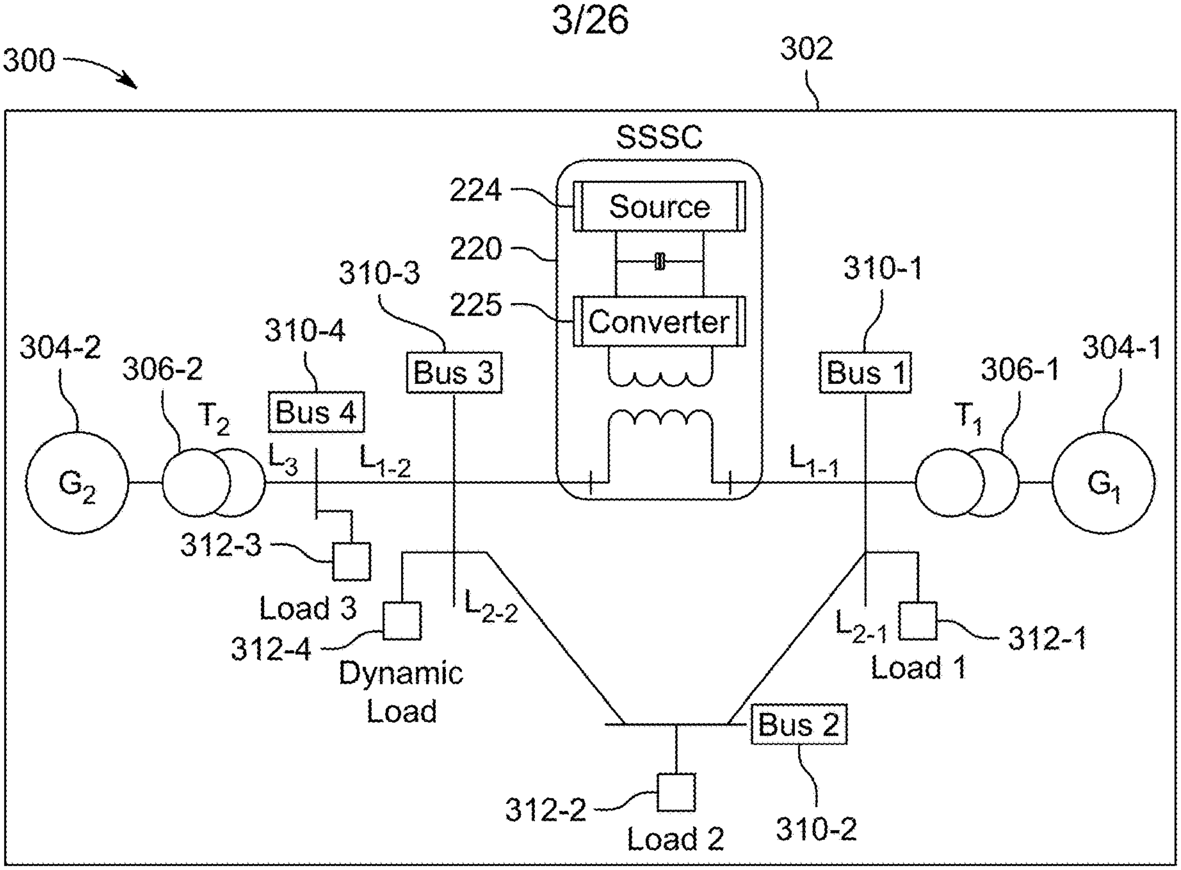
FIG. 3 illustrates an exemplary schematic diagram of a multi-machine interconnected system with the SSSC, according to certain embodiments.

FIG. 3 illustrates an exemplary schematic diagram 300 of a multi-machine interconnected system with the SSSC, according to certain embodiments.

The multi-machine interconnected system 302 comprises two synchronous generators, $G_1$ 304-1 and $G_2$ 304-2, each connected to the main grid through step-up transformers $T_i$ 306-1 and $T_2$ 306-2, respectively. The transmission network comprises multiple transmission line segments ($L_{1-1}$ 308-1, $L_{1-2}$ 308-2, $L_{2-1}$ 308-3, $L_{2-2}$ 308-4, and $L_3$ 308-5) that interconnect the generators and load buses. Bus 1 310-1, Bus

2 310-2, Bus 3 310-3, and Bus 4 310-4 serve as electrical junction points for power transfer across the system. Multiple types of electrical loads are connected to the buses, including Load 1 312-1, Load 2 312-2, and Load 3 312-3, where a Dynamic Load 312-4 represents time-varying or fluctuating demand. At Bus 3, the static synchronous series compensator (SSSC) 220 is integrated in series with the transmission line. The SSSC 220 comprises the DC Source 224 and the Voltage Source Converter 226, which together generate a controllable reactive voltage. This compensating voltage is injected in series with the transmission line to regulate power flow and enhance system stability.

During operation, the generators $G_1$ 304-1 and $G_2$ 304-2 supply electrical power through their respective transformers ($T_1$ 306-1 and $T_2$ 306-2) to the interconnected transmission network. Power is transmitted across the buses (Bus 1 310-1, Bus 2 310-2, Bus 3 310-3, and Bus 4 310-4) and distributed to the static and dynamic loads based on demand. As load and system conditions vary, fluctuations in real and reactive power flow may arise, potentially leading to instability or inefficient power transfer. The SSSC 220 monitors the line current and injects a controlled series voltage to modify the effective line impedance, thereby regulating the active and reactive power flow between the generators. By dynamically adjusting the power flow along the transmission line, the SSSC 220 enhances voltage stability, improves power sharing between the machines, and maintains overall system reliability under load variations or disturbances.

In an embodiment, the SSSC is employed to regulate power flow in the transmission network by injecting a controllable compensating voltage $V_q$ in series with the transmission line. The SSSC comprises a voltage-sourced converter (VSC) electrically coupled to the transmission line through a series coupling transformer. The injected voltage $V_q$ is maintained in quadrature alignment with the line current, thereby enabling the SSSC to emulate either inductive or capacitive reactance and consequently control the distribution of active and reactive power within the grid.

The VSC is energized by a DC-link capacitor, which serves as an energy storage element to support voltage regulation and compensate for losses in the converter and transformer. Depending on the control strategy and system operating conditions, the SSSC may function in either a self-regulating mode, where the DC-link voltage is maintained autonomously, or in a grid-assisted mode that utilizes an external energy support source.

The operational characteristics and performance objectives of the SSSC dictate its mode of compensation. The associated mathematical model representing the dynamic behavior of the SSSC is derived based on its power-flow regulation capability for the purpose of mitigating frequency oscillations in the interconnected power grid. As illustrated in FIG. 3, the tie-line power flow can be directly influenced by adjusting the magnitude of the SSSC injected voltage.

Accordingly, the injected voltage of the SSSC, denoted as modeling of SSSC as $V_{SSSC}$, is maintained orthogonal to the line current I, reflecting the device's primary role in reactive power control. This relationship is mathematically expressed in Equation (15).

$$V_{SSSC} = JV_{SSSC}\left(\frac{i}{I}\right) \qquad \text{Equation (15)}$$

The unit vector of the current along the line is $$\left(\frac{i}{I}\right).$$

The current is expressed by Equation (16).

$$\dot{I} = \frac{\left(\dot{V}_1 - \dot{V}_2 - jV_{SSSC}\left(\frac{\dot{I}}{I}\right)\right)}{JX_I} \qquad \text{Equation (16)}$$

Where, $V_1$ and $V_2$ are the voltages at buses 1 and 2, respectively. $X_1$ is the reactance of the tie-line.
The active and reactive power flows across bus $V_i$ are represented as Equation (17):

$$P_{12}+jQ_{12}=\ddot{V}_1\bar{I} \qquad \text{Equation (17)}$$

Where, $I^-$ is a conjugate of I: Putting (16) in (17) yields:

$$P_{12} + Q_{12} = \left(\frac{V_1V_2}{X_I}\right)\sin(\delta_1 - \delta_2) - V_{SSSC}\left(\frac{V_1\dot{I}}{X_I I}\right) + j\left(\left(\frac{V_1^2}{X_I}\right) - \left(\left(\frac{V_1V_2}{X_I}\right)\cos(\delta_1 - \delta_2)\right)\right. \qquad \text{Equation (18)}$$

$$P_{12} = \left(\frac{V_1V_2}{X_I}\right)\sin(\delta_1 - \delta_2) - \left(\frac{P_{12}}{X_I I}\right)V_{SSSC} \qquad \text{Equation (19)}$$

Considering the $V_1$ and $V_2$ are constant and the starting value of $V_{SSSC}$ is zero. So, linearizing Equation (19) is transformed into Equation (20).

$$\Delta P_{12} = \frac{V_1V_2\cos(\delta_{10} - \delta_{20})}{X_I}(\Delta\delta_1 - \Delta\delta_2) - \frac{P_{I20}}{X_I I_0}\Delta V_{SSSC} \qquad \text{Equation (20)}$$

In an embodiment, the Redox Flow Battery (RFB) energy storage system is incorporated into the interconnected power grids to provide dynamic power balancing by performing controlled charging and discharging operations based on real-time system power conditions. The RFB functions to absorb surplus electrical energy when generation exceeds demand and to release stored energy when a power deficit occurs, thereby contributing to frequency stabilization and system reliability.

The considered power network comprises three generation sources, namely thermal, photovoltaic (PV), and wind units, collectively supplying power to the grid. The RFB-based Battery Energy Storage System (BESS) operates in two distinct modes:

- Charging Mode, in which excess generated power is directed to the RFB to increase its stored energy
- Discharging Mode, in which the RFB releases stored energy to compensate for power shortages The mathematical representations for the charging and discharging behaviors of the RFB are provided in Equations (21) and (22), respectively.

Under conditions where the combined thermal/PV/wind generation exceeds the instantaneous load demand at time t, the excess electrical energy is transferred into the RFB, thereby charging the electrolyte storage tanks. The state of stored energy in the RFB at time t may be determined using the corresponding charging relationship expressed in Equation (21)

$$E_{storg}(t) = E_{storg}(t-1) + \left[P_{PV}(t) + P_{Wind}(t) + P_{thermal}(t) - \frac{P_{Load}(t)}{\eta_{Inv}}\right] \cdot \Delta t \quad \text{Equation (21)}$$

Energy storage at different times is denoted t and t–1. Inverter efficiency is represented by $\eta_{inv}$.

Conversely, when the instantaneous power demand at time t exceeds the total electrical energy generated by the thermal/PV/wind system, the Redox Flow Battery (RFB) transitions to a discharging mode to compensate for the resulting power deficit. In this condition, the stored energy within the battery bank is utilized to supply the required supplementary power.

Accordingly, the state of stored energy in the RFB at time t is determined in accordance with the discharging expression provided in Equation (22).

$$E_{storg}(t) = E_{storg}(t-1) - \left[\frac{P_{Load}(t)}{\eta_{Inv}} - (P_{PV}(t) + P_{Wind}(t) + P_{thermal}(t))\right] \cdot \Delta t. \quad \text{Equation (22)}$$

In an aspect, a Two-Degree-of-Freedom Model Predictive Control integrated with Linear Active Disturbance Rejection Control (2DoF-MPC-LADRC) is formulated for mitigating frequency deviations arising due to internal perturbations and external load variations within a multi-area interconnected power system. The proposed control architecture provides enhanced controllability, improved dynamic response, and robust handling of operational constraints associated with power system uncertainty and variability.

Model Predictive Control (MPC) has been widely adopted in industrial and academic applications due to its capability to forecast plant dynamics and optimally regulate control actions. Early industrial MPC realizations primarily employed finite impulse response (FIR) or step-response-based prediction models. In such configurations, the control input is determined by solving an online optimization problem subject to system performance criteria and actuator/input constraints. The initial control action of the computed optimal sequence is applied to the plant at each sampling instant, followed by continual updating of the model prediction through feedback correction, wherein the correction factor is obtained from the deviation between measured and predicted outputs. Accordingly, the optimization procedure is iteratively resolved at each sampling interval.

Although classical MPC methodologies have demonstrated substantial effectiveness, earlier formulations were characterized by strong structural assumptions, thereby imposing limitations on controller adaptability and disturbance robustness. To address such limitations, the feedback correction mechanism embedded within MPC inherently enhances the disturbance rejection capability, as disturbances within the predictive model may be either directly measured or estimated.

In an aspect, the MPC formulation explicitly incorporates disturbance effects into the Load Frequency Control (LFC) model. Specifically, two disturbance components are considered within the predictive framework:

Area Control Error (ACE)

Localized load perturbation associated with each interconnected area

A reduced-order representation of the MPC state prediction model, including disturbance dynamics is expressed in Equation (23), while the corresponding output representation is given in Equation (24).

$$x(t+1)=Ax(t)+Bu(t)+B_d d(t) \quad \text{Equation (23)}$$

$$y(t)=Cx(t) \quad \text{Equation (24)}$$

The multi-area continuous time interconnected power system as expressed in Equation (25)

$$x_i(k+1) = A_i(k)x_i(k) + B_i(k)u_i(k) + D_i(k)w_i(k) = \sum_{\substack{j=1 \\ j \neq i}} A_{ij}(k)x_j(k) + B_{ij}(k)u_j(k),\ y_i(k) \quad \text{Equation (25)}$$

Equation (25) is used to predict the future state variable at each sampling time k. Where, $x_t(k+n|k)$ and $y_i(k+n|k)$ are nominated as the predicted state and output trajectory of the subsystem. The control problem for an optimal output is stated for i area as expressed in Equation (26).

$$minJ_i(k) = \sum\nolimits_{n=0}^{\infty} \left[x_i^T(k+n \mid k)Q_i x_i(k+n \mid k) + u_i^T(k+n \mid k)R_i u_i(k+n \mid k) - \rho_i^2 w_i^T(k+n \mid k)w_i(k+n \mid k)\right] + \sum\nolimits_{\substack{j \neq i \\ i=1}}^{L} \sum\nolimits_{n=0}^{N_c} \left[x_j^T(k+n \mid k)Q_j x_j(k+n \mid k) + u_j^{T\times}(k+n \mid k)R_j u_j^*(k+n \mid k)\right] \quad \text{Equation (26)}$$

Figure 4:
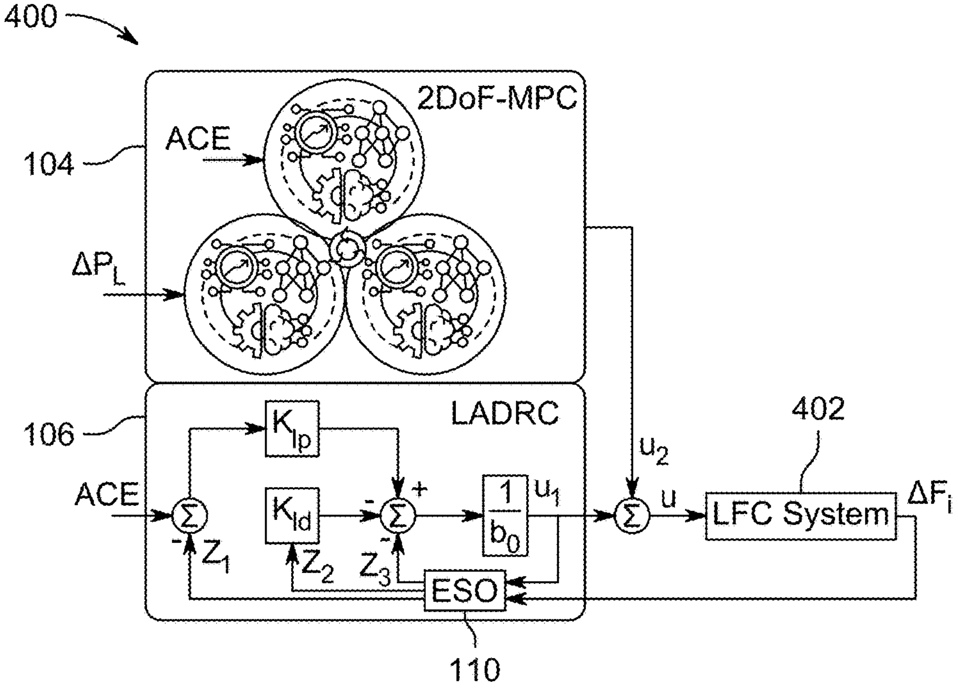
FIG. 4 illustrates an exemplary schematic representation of a 2 degree of freedom-based model predictive controller (2DoF-MPC)-linear active disturbance rejection control (LADRC) for an interconnected power system (IPS), according to certain embodiments.

FIG. 4 illustrates an exemplary schematic representation 400 of a 2 degree of freedom-based model predictive controller (2DoF-MPC) 104—linear active disturbance rejection control (LADRC) 106 for an interconnected power system (IPS), according to certain embodiments.

The system under consideration exhibits multiple nonlinear characteristics, thereby requiring the coordinated tuning of several control parameters when employing a conventional Active Disturbance Rejection Control (ADRC) strategy. To simplify implementation and reduce computational burden, a second-order Linear Active Disturbance Rejection Control (LADRC) architecture is adopted.

A controller integrates the Two-Degree-of-Freedom Model Predictive Controller (2DoF-MPC) 104 and the Linear Active Disturbance Rejection Controller (LADRC) 106 to regulate the load frequency control (LFC) system 402. The 2DoF-MPC 104 receives the Area Control Error (ACE) and load disturbance ($\Delta P_1$) signals, where it predicts future system behavior and generates an optimized control signal $u_2$ to improve dynamic performance and reference tracking. The LADRC 106 processes the ACE through a proportional gain $K_{ip}$ and a disturbance compensation gain $K_t d$, while an Extended State Observer (ESO) 110 estimates internal dynamics and external disturbances, producing corrective terms $z_1$, $z_2$, and $z_3$. These outputs are combined to generate the LADRC control action $u_1$, scaled by the factor $1/b_o$. Both MPC-based control signal $u_2$ and LADRC signal $u_1$ are summed to form the final control input u, which drives the LFC system 402 to suppress frequency deviation $\Delta F_i$. Overall, the process ensures predictive control via the 2DoF-MPC 104 while the LADRC 106 actively rejects disturbances, resulting in improved transient response, robust stability, and steady-state frequency regulation.

LADRC is distinguished by its inherent capability to estimate and compensate for internal and external disturbances in real time. This functionality is realized through the incorporation of a Linear Extended State Observer (LESO), which represents an enhancement of a traditional observer structure. The LESO is configured to receive both the control input and the measured output of the controlled plant as inputs. By introducing an augmented state variable that represents the total disturbance acting on the system, the LESO is able to observe and reconstruct unknown perturbations, thereby enabling their active rejection through the control law.

A significant advantage of the Extended State Observer (ESO) 110 is that it does not require explicit knowledge of the disturbance model, nor does it rely on the precise mathematical representation of the system dynamics to estimate the disturbance term. Instead, the ESO 110 continuously adapts based on real-time measurements, which enhances resilience against parameter uncertainties and modeling inaccuracies.

The design formulation can be extended to an n-order plant model, enabling generalized compensation of disturbances and system dynamics.

Designing for n-Order of Objects:

$$y^{(n)}=f(y,\dot{y}, \ldots ,y^{(n-1)},u,\dot{u}, \ldots ,u^{(n-1)},w,t)+bu \quad \text{Equation (27)}$$

The unpredictable disturbance is denoted by w. y and u are the output and input of the system, respectively. b is the control gain.

The state space equation may be expressed as:

$$\begin{cases} \dot{x} = Ax + Bu + Eh \\ y = Cx \end{cases} \quad \text{Equation (28)}$$

$$A = \begin{bmatrix} 0 & 1 & 0 & \cdots & 0 \\ 0 & 0 & 1 & \cdots & 0 \\ \vdots & \vdots & \vdots & \ddots & 0 \\ 0 & 0 & 0 & \cdots & 1 \\ 0 & 0 & 0 & \cdots & 0 \end{bmatrix}, B = \begin{bmatrix} 0 \\ 0 \\ \vdots \\ b \\ 0 \end{bmatrix}, \quad \text{Equation (29)}$$

$$E = \begin{bmatrix} 0 \\ 0 \\ \vdots \\ 0 \\ 0 \end{bmatrix}, c = [1 \ \ 0 \ \ \cdots \ \ 0 \ \ 0]$$

The control theory defines LESO as expressed in Equation (30).

$$\begin{cases} \dot{\hat{x}} = A\hat{x} + Bu + L(y - \hat{y}) \\ \hat{y} = C\hat{x} \end{cases} \quad \text{Equation (30)}$$

The estimated value of x is $\hat{x}$, and the state observer gain matrix is defined by L, which is stated in Equation (31).

$$L=[\beta_1,\beta_2, \ldots ,\beta_{n+1}]^T \quad \text{Equation (31)}$$

Now, by applying classical control theory x̂n+1 to f, it may be deduced as Equation (32).

$$\frac{\hat{x}_{n+1}}{f} = \frac{\beta_{n+1}}{s^{n+1} + \beta_1 s^n + \cdots + \beta_n s + \beta_{n+1}} \quad \text{Equation (32)}$$

The state observer poles are arranged at $-\omega_0$ for practical ease, as shown in Equation (33).

$$s^{n+1}+\beta_1 s^n+ \ldots +\beta_n s+\beta_{n+1}=(s+\omega_0)^{n+1} \quad \text{Equation (33)}$$

The extended state observer (ESO) 110 requires the adjustment of a single primary tuning parameter, namely the observer bandwidth $\omega_0$. $\omega_0$ is increased to enhance the accuracy of disturbance estimation by enabling faster tracking of total disturbance. However, excessively high values of $\omega_0$ may introduce an undesirable amplification of measurement noise, thereby degrading control performance. Accordingly, $\omega_0$ is selected such that it provides an appropriate balance between the disturbance estimation precision and the noise sensitivity, in accordance with the dynamic characteristics and noise environment of the system. The corresponding control input signal generated by the LADRC 106 is formalized in Equation (34).

$$u = \frac{-\hat{x}_{n+1} + u_0}{b} \quad \text{Equation (34)}$$

The model object is then estimated to an integral sequence link for simple control once the control quantity u has compensated the system for both internal and external disturbances. In LADRC 106, the control law is expressed as in Equation (36).

$$u_0=k_1(r-\hat{x}_1)+k_1(r^2-\hat{x}_1)+ \ldots +k_{n-1}(r^{n-1}-\hat{x}_{n-1})-k_n\hat{x}_n \quad \text{Equation (36)}$$

In Equation (36), r represents the reference track and $k=[k_1, k_2, \ldots , k_n]^T$ is defined as the controller gain matrix.

$$y^{(n)}=k_1(r-y)+k_2(r^2-\dot{y})+ \ \ldots \ +k_{n-1}(r^{n-1}-y^{(n-2)})-k_n y^{(n-1)} \quad \text{Equation (37)}$$

The transfer function for the closed loop, for r input to y output, may be stated as Equation (38).

$$G(s) = \frac{k_1}{s^n + k_n s^{n-1} + \cdots + k_1} \quad \text{Equation (38)}$$

The observer parameter $\omega_0$ is set, and it is known as the observer bandwidth given by Equation (39)

$$\begin{cases} \beta_1 = 3\omega_0 \\ \beta_2 = 3\omega_0^2 \\ \beta_3 = \omega_0^3 \end{cases} \quad \text{Equation (39)}$$

The overall amalgamated output of the 2DoF-MPC and LADRC is summarized by Equation (40)

$$u=u_1+u_2 \quad \text{Equation (40)}$$

The designing of the control parameters of the LADRC while considering the dynamic response of hybrid interconnected PS and optimum performance depicted at $K_1$=17.1, $K_2$=2.03, $\omega_0$=7 and $\omega_c$=15.

In an embodiment, the present disclosure validates the performance and functional effectiveness of a two-degree-of-freedom model predictive control integrated with linear active disturbance rejection control (2DoF-MPC-LADRC) scheme for enhancing load frequency control (LFC) in an interconnected power grid system. The 2DoF-MPC-LADRC configuration is implemented in conjunction with a Redox Flow Battery (RFB) unit and a Static Synchronous Series Compensator (SSSC) to stabilize frequency deviations and improve dynamic response under varying load and disturbance conditions. The implementation of the 2DoF-MPC-LADRC architecture has been carried out using the MATLAB/Simulink 2023a simulation platform. The performance of the control framework has been assessed across multiple operational conditions of the interconnected power system (IPS), including variations in load demand, system parameter aberrations, and integration of renewable energy sources (RESs). To demonstrate adaptability, robustness, and response consistency, various test scenarios have been formulated and executed, including:

Scenario 1: Response evaluation under step load perturbations of 3% and 5% (as shown in FIGS. 6A-6F and 7A-7F).

Scenario 2: System response under variable step load disturbances in both interconnected areas (as shown in FIGS. 8A-8D and FIG. 9).

Scenario 3: System behavior under stochastic/random load fluctuations (as shown in FIGS. 10A-10D and FIG. 11).

Figure 12A:
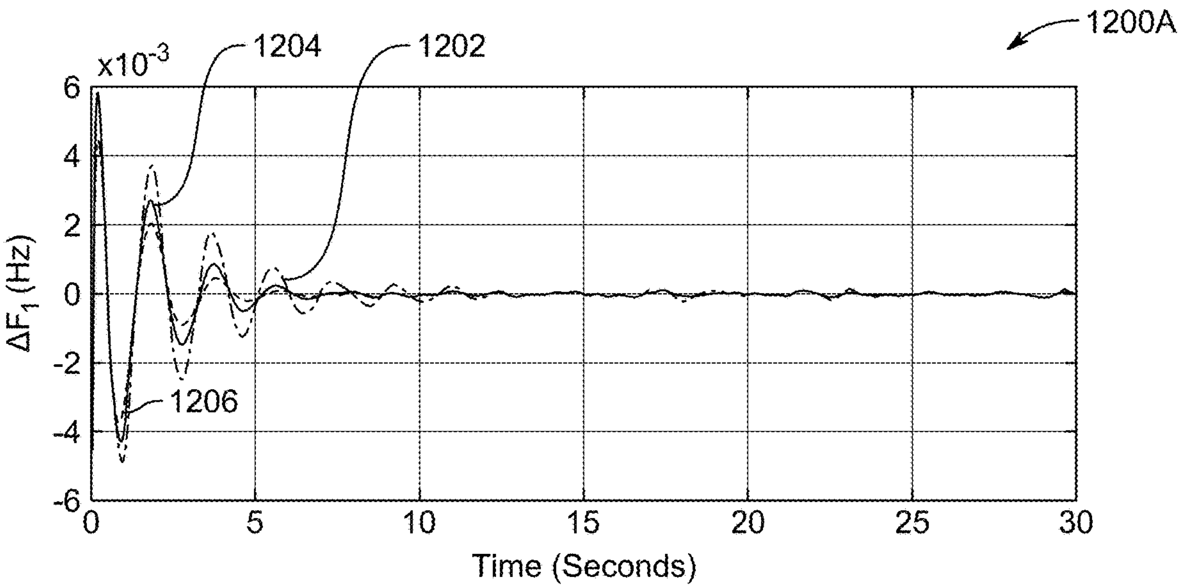
FIG. 12A illustrates an exemplary graphical representation of sensitivity analysis response of the 2DoF-MPC-LADRC of $\Delta F_1$, according to certain embodiments.
Figure 12B:
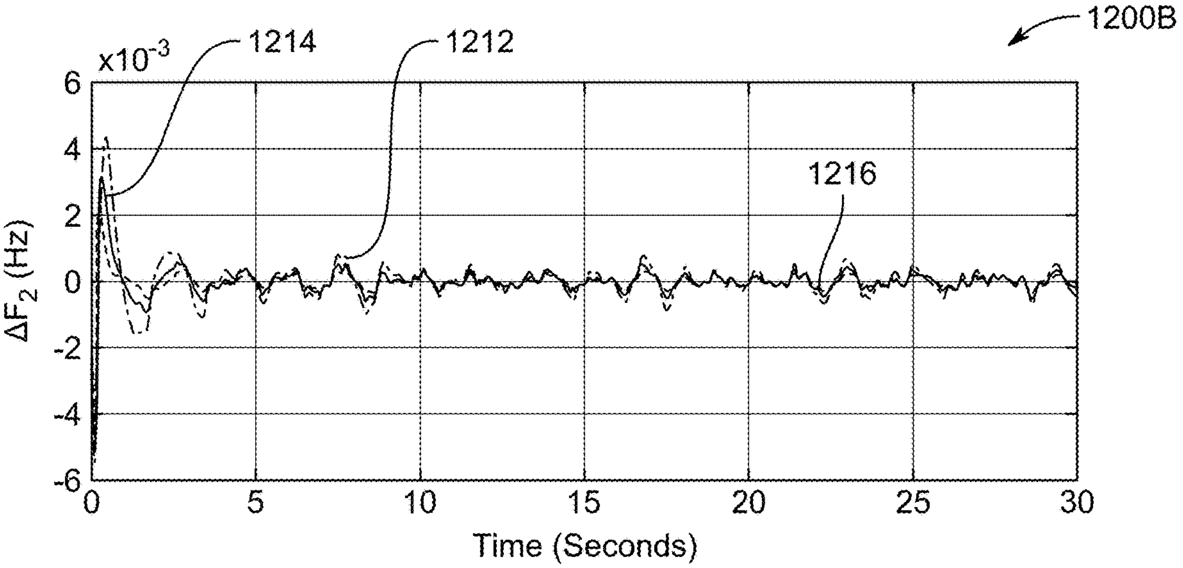
FIG. 12B illustrates an exemplary graphical representation of the sensitivity analysis response of the 2DoF-MPC-LADRC of $\Delta F_2$, according to certain embodiments.
Figure 12C:
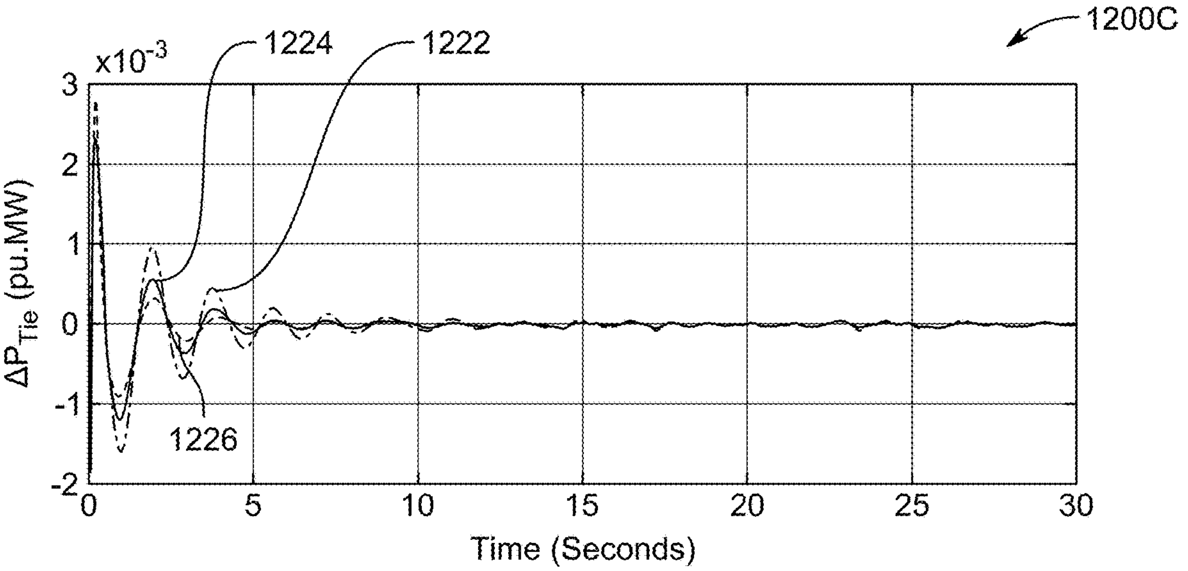
FIG. 12C illustrates an exemplary graphical representation of the sensitivity analysis response of the 2DoF-MPC-LADRC of $\Delta P_{Tie}$, according to certain embodiments.

Scenario 4: Sensitivity analysis under power system parameter deviations and uncertainties (as shown in FIGS. 12A-12C).

Figure 13A:
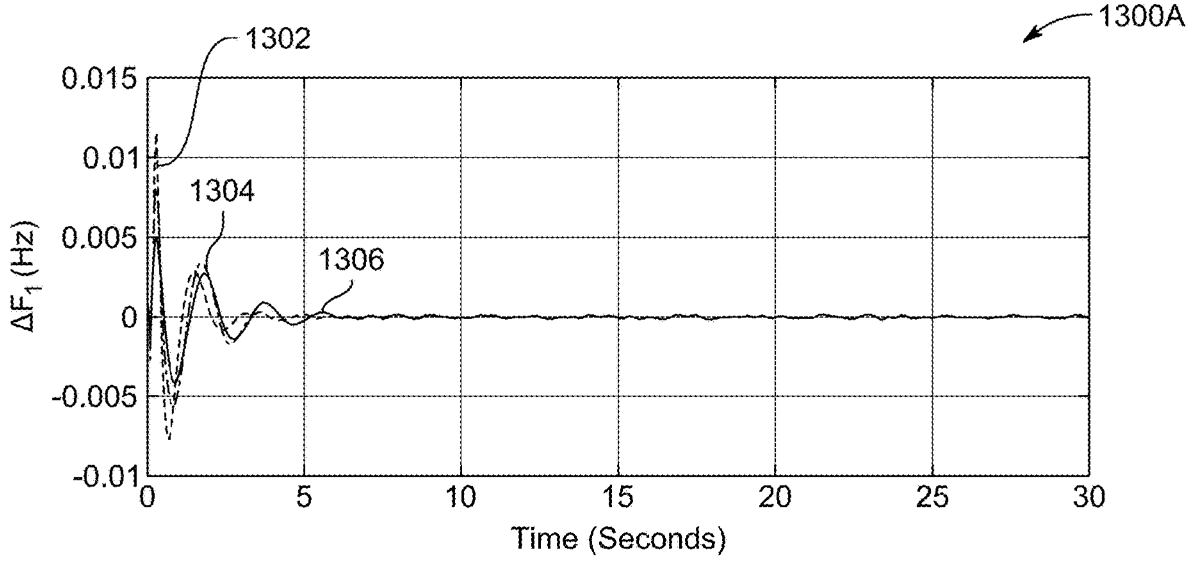
FIG. 13A illustrates an exemplary graphical representation of sources impact analysis of the 2DoF-MPC-LADRC of $\Delta F_1$, according to certain embodiments.
Figure 13B:
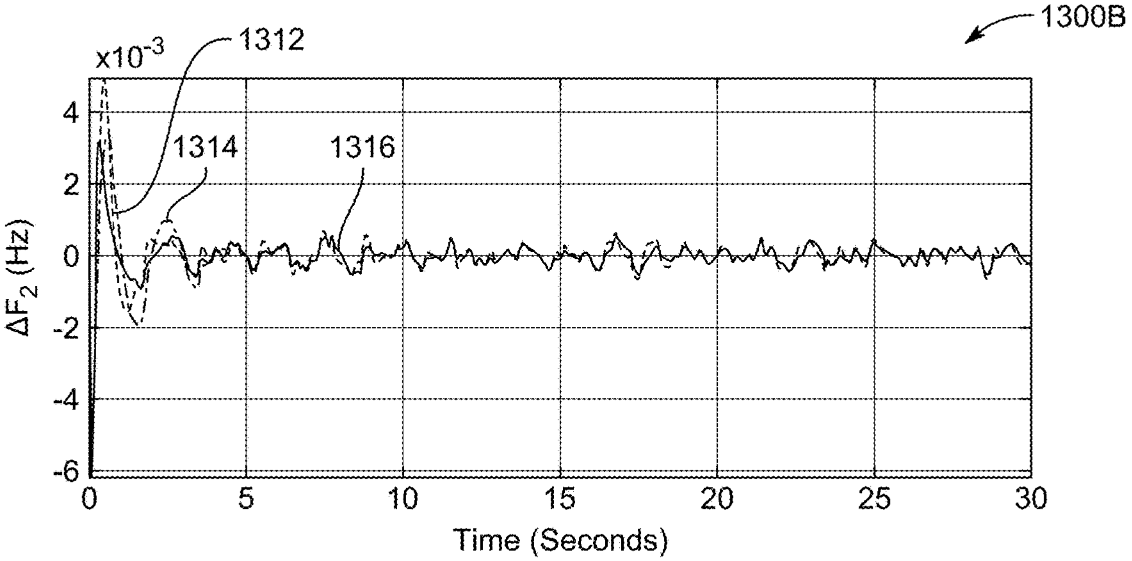
FIG. 13B illustrates an exemplary graphical representation of the sources impact analysis of the 2DoF-MPC-LADRC of $\Delta F_2$, according to certain embodiments.
Figure 13C:
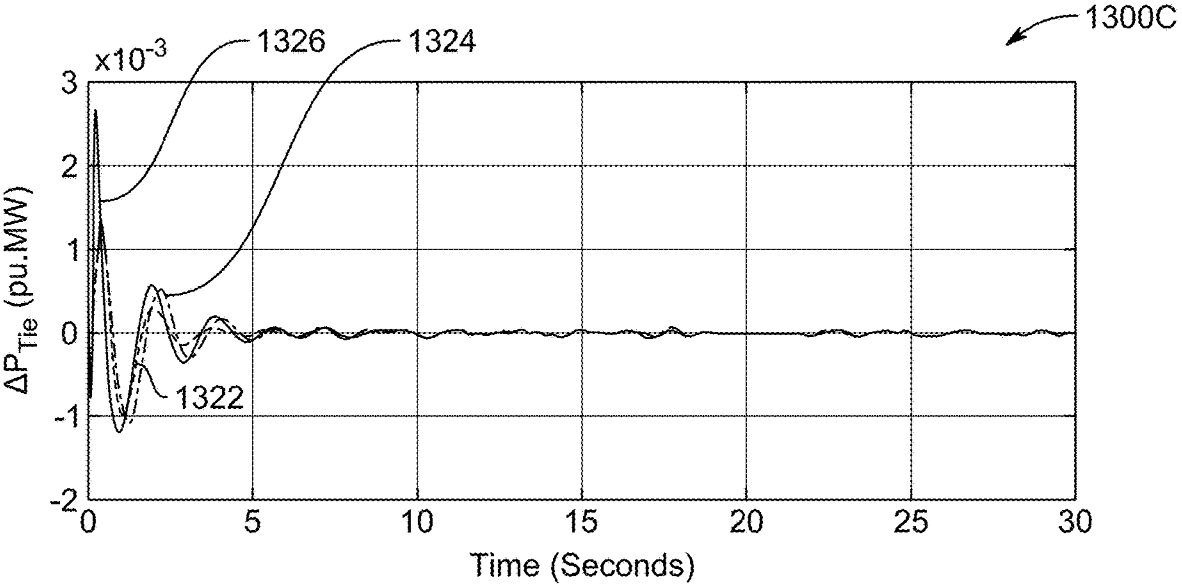
FIG. 13C illustrates an exemplary graphical representation of the sources impact analysis of the 2DoF-MPC-LADRC of $\Delta P_{Tie}$, according to certain embodiments.

Scenario 5: Performance impact assessment considering RES penetration and coordinated operation of RFB and SSSC units (as shown in FIGS. 13A-13C).

The results obtained from the above scenarios substantiate the capability of the 2DoF-MPC-LADRC scheme to achieve improved frequency stability, disturbance rejection, and enhanced dynamic resilience in the interconnected power systems.

Figure 5A:
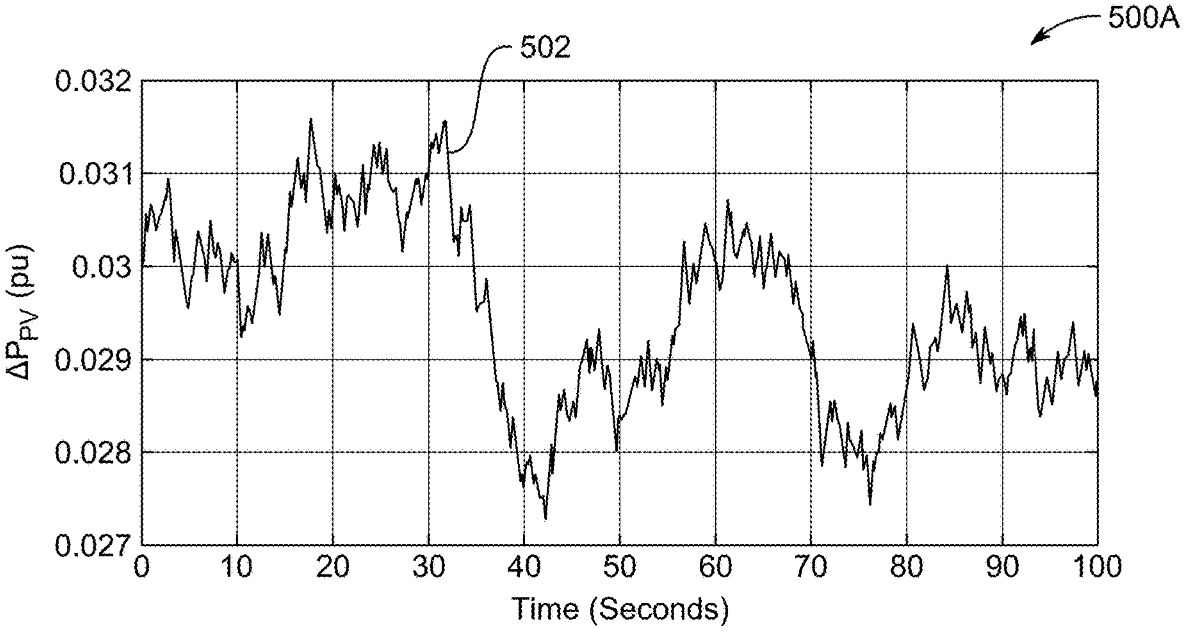
FIG. 5A illustrates an exemplary graphical representation of photovoltaic (PV) power response, according to certain embodiments.
Figure 5B:
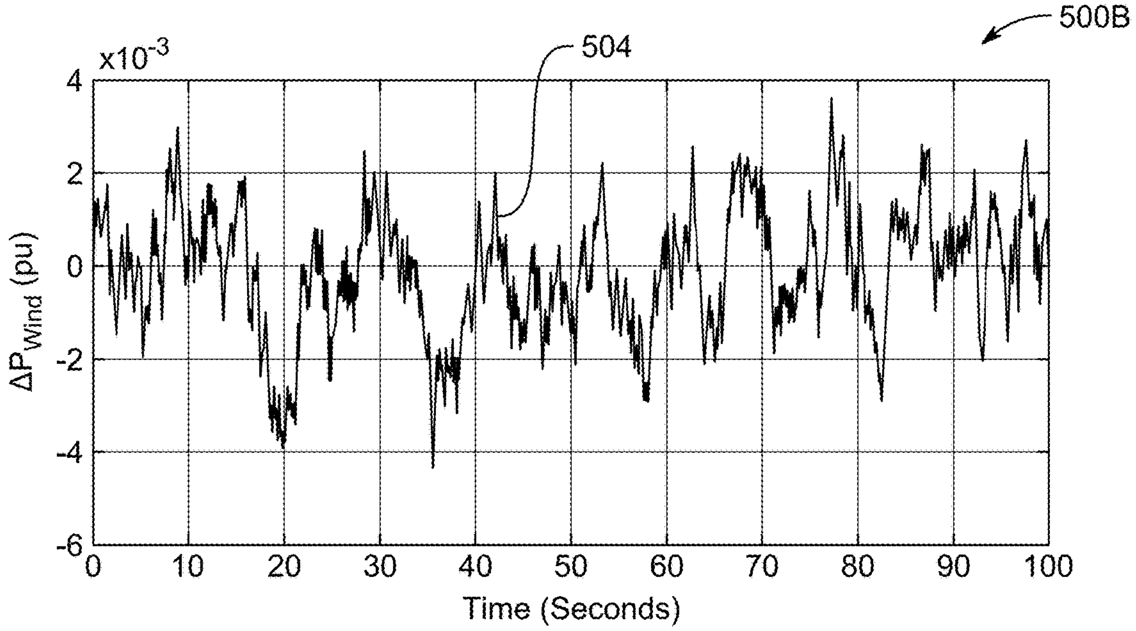
FIG. 5B illustrates an exemplary graphical representation of wind power response, according to certain embodiments.

FIGS. 5A-5B illustrate exemplary graphical representations 500A, 500B of photovoltaic (PV) power response and wind power response, respectively, according to certain embodiments.

The graphical representations 500A and 500B show RESs penetrated power response of PV and wind, respectively. In the graphical representation 500A, X-axis represents time (t) in seconds, while Y-axis represents the $\Delta P_{PV}$ in pμ. Line 502 represents the power generated output response of the PV.

In the graphical representation 500B, X-axis represents time (t) in seconds, while Y-axis represents the $\Delta P_{WIND}$ in pμ. Line 504 represents the power generated output response of the wind.

The aggregate contribution of the RESs is maintained at approximately 30% of the total power capacity of the power system. This elevated penetration level is selected to evaluate system stability, power regulation effectiveness, and dynamic response under conditions representative of modern renewable-integrated grids. The graphical representations 500A and 500B indicate the variation in generated power from each RES under dynamic operating conditions and further support the assessment of the controller's capability to maintain system stability during high renewable energy integration scenarios.

In an aspect, the performance of the 2DoF-MPC-LADRC is evaluated for the PS characterized by high penetration of renewable energy sources (RESs). To assess the robustness and dynamic compensation capability of the controller under abrupt demand fluctuations, step load variation (SLV) conditions of approximately 3% and 5% of the nominal system load are introduced. The applied step load changes induce transient frequency and tie-line power deviations, enabling quantitative examination of the control strategy's disturbance rejection, tracking accuracy, and stability enhancement performance under realistic operating disturbances. The performance analysis of the controller at 3% SLV is represented in FIGS. 6A-6B, 6C-6D, and 6E-6F, while the performance analysis of the controller at 5% SLV is represented in FIGS. 7A-7B, 7C-7D, and 7E-7F.

Figure 6A:
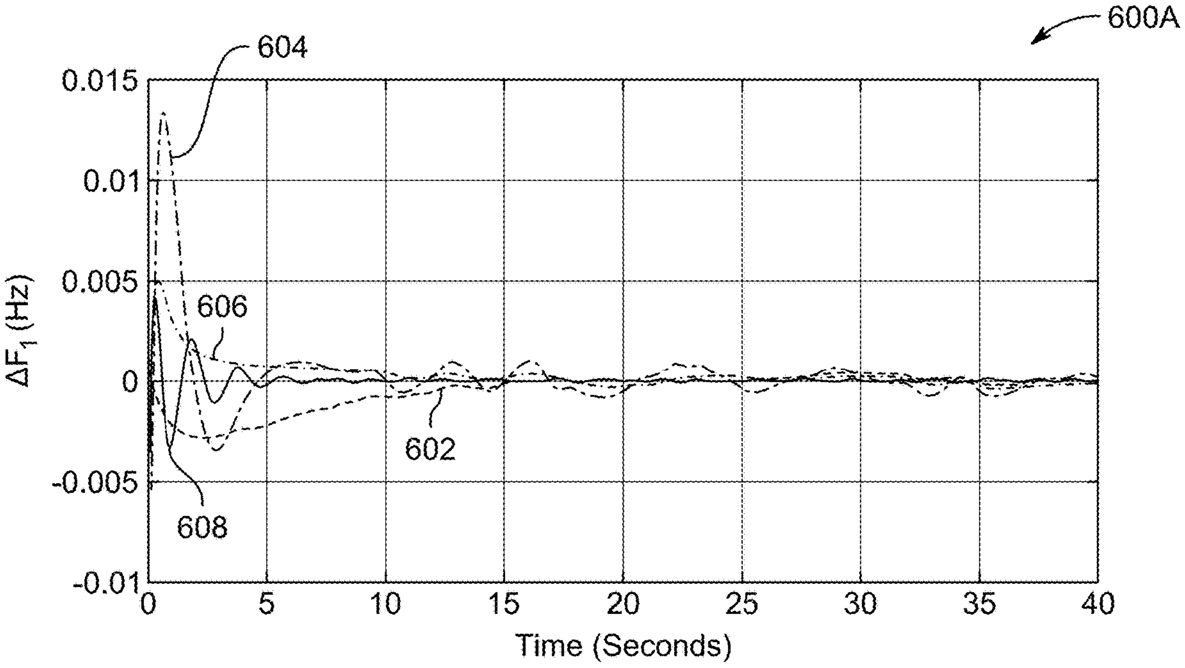
FIGS. 6A-6B illustrate exemplary graphical representations of performance analysis of the controller at 3% step load variation (SLV) of $\Delta F_1$, according to certain embodiments.
Figure 6B:
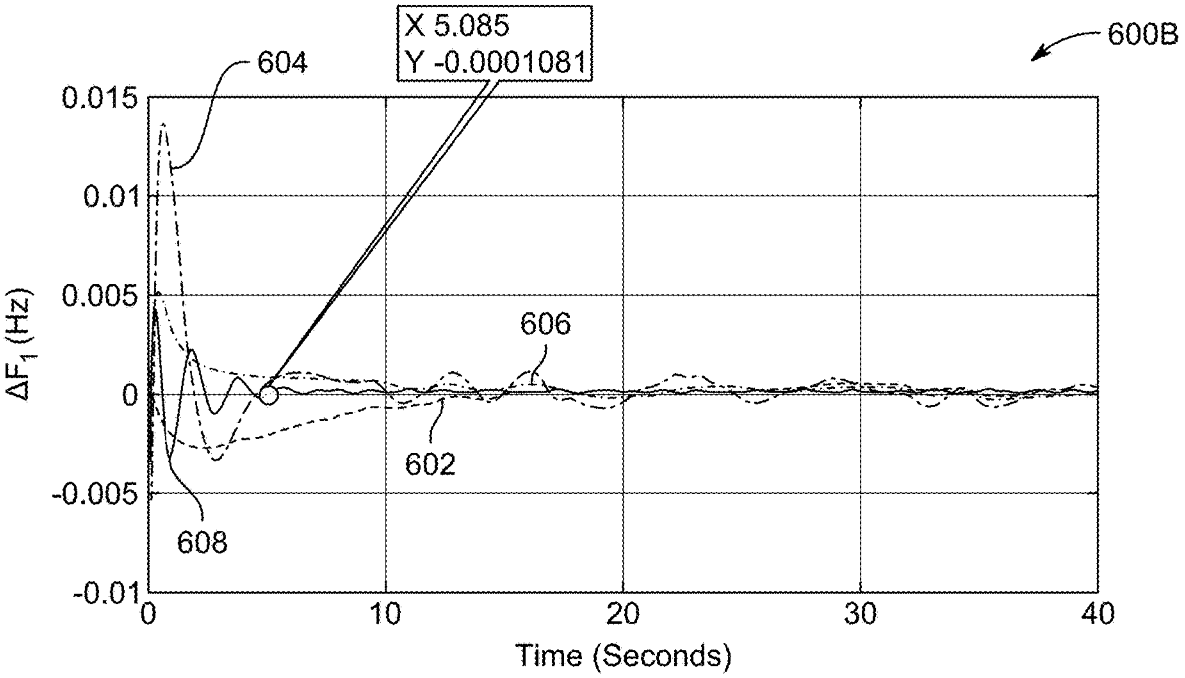

FIGS. 6A-6B illustrate exemplary graphical representations 600A, 600B of performance analysis of the controller at 3% SLV of $\Delta F_1$, according to certain embodiments.

The graphical representations 600A and 600B show the performance analysis of the controller at 3% SLV of $\Delta F_1$. In the graphical representations 600A and 600B, X-axis represents time (t) in seconds, while Y-axis represents the $\Delta F_1$ in Hz. Line 602 represents the MPC, line 604 represents the LADRC, line 606 represents MPC-LADRC, while line 608 represents 2DoF-MPC-LADRC. The graphical representation 600A and 600B shows the performance analysis of controller at 3% SLV for the frequency $\Delta F_1$ regulation in Area-1.

Figure 6C:
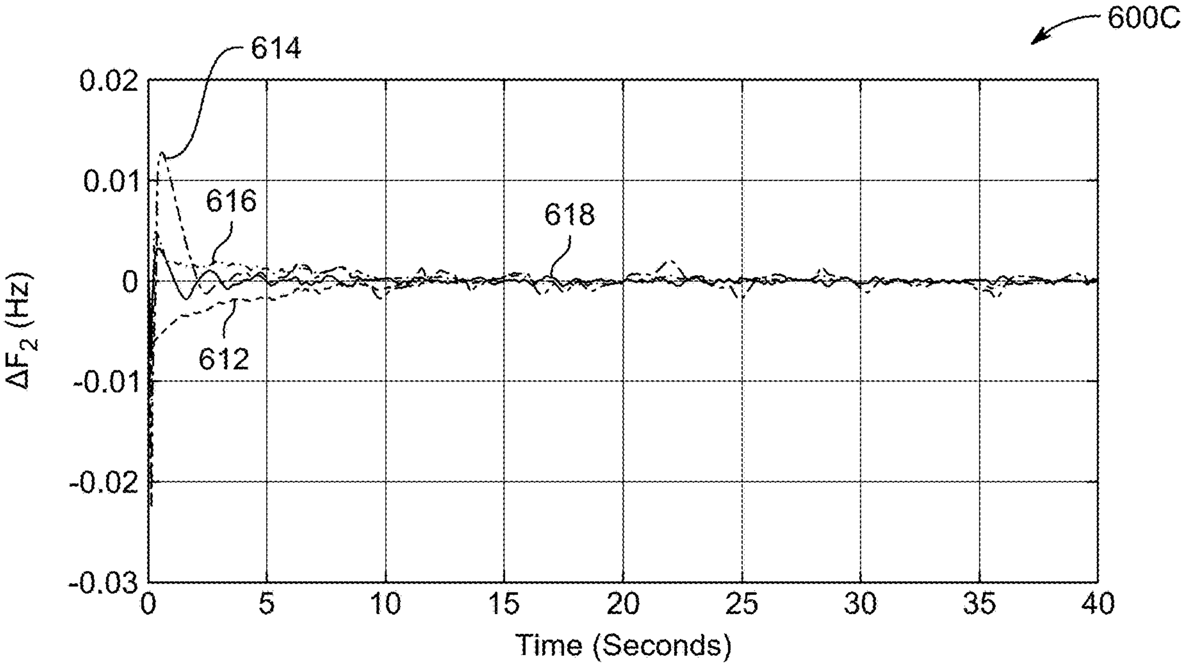
FIGS. 6C-6D illustrate exemplary graphical representations of the performance analysis of the controller at 3% SLV of $\Delta F_2$, according to certain embodiments.
Figure 6D:
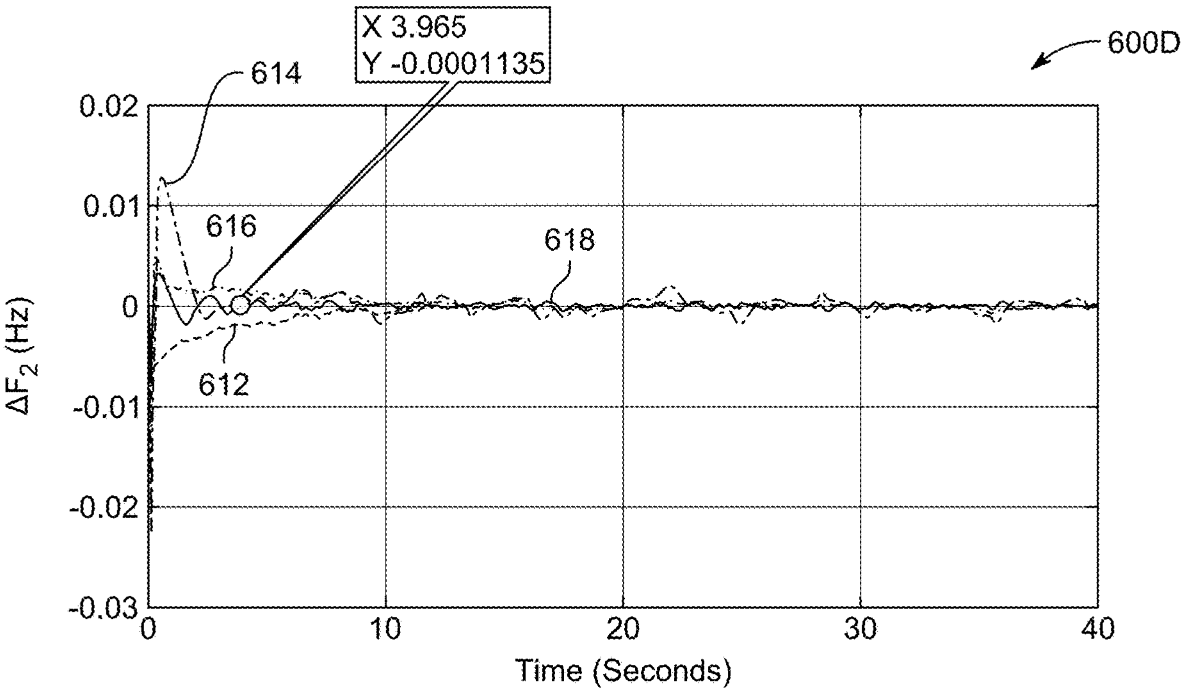

FIGS. 6C-6D illustrate exemplary graphical representations 600C, 600D of performance analysis of the controller at 3% SLV of $\Delta F_2$, according to certain embodiments.

The graphical representations 600C, and 600D show the performance analysis of the controller at 3% SLV of $\Delta F_2$. In the graphical representations 600C and 600D, X-axis represents time (t) in seconds, while Y-axis represents the $\Delta F_2$ in Hz. Line 612 represents the MPC, line 614 represents the LADRC, line 616 represents MPC-LADRC, while line 618 represents 2DoF-MPC-LADRC. The graphical representation 600C and 600D shows the performance analysis of the controller at 3% SLV for the frequency $\Delta F_2$ regulation in Area-2.

Figure 6E:
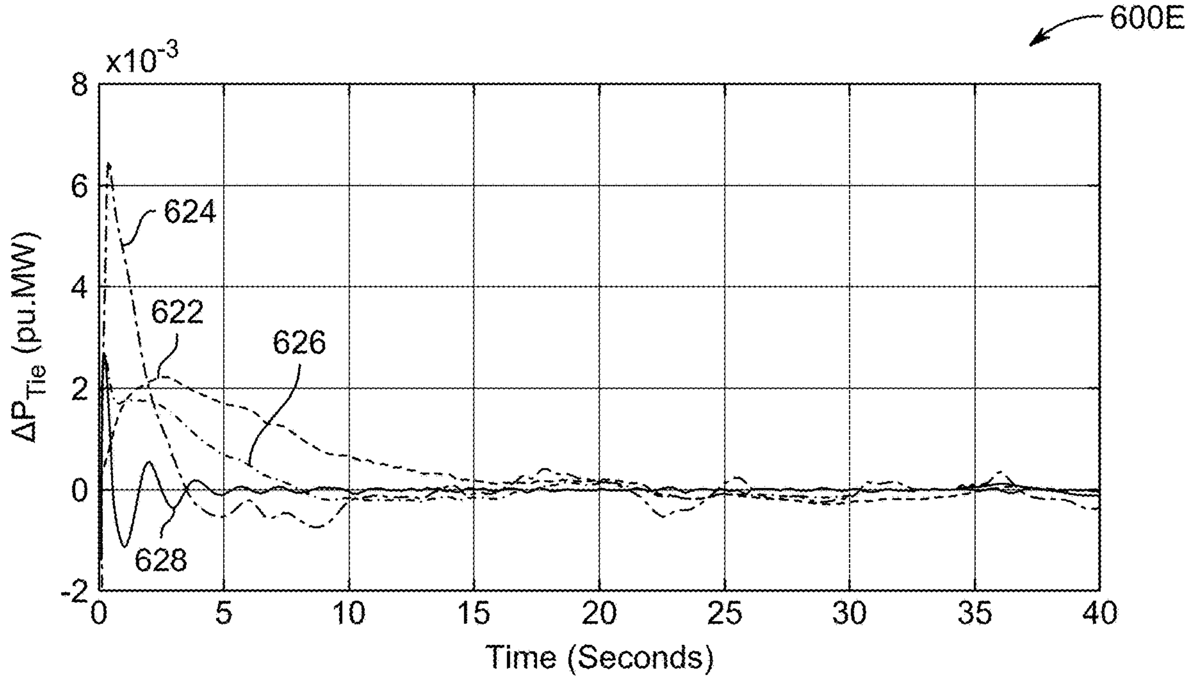
FIGS. 6E-6F illustrate exemplary graphical representations of the performance analysis of the controller at 3% SLV of $\Delta P_{Tie}$, according to certain embodiments.
Figure 6F:
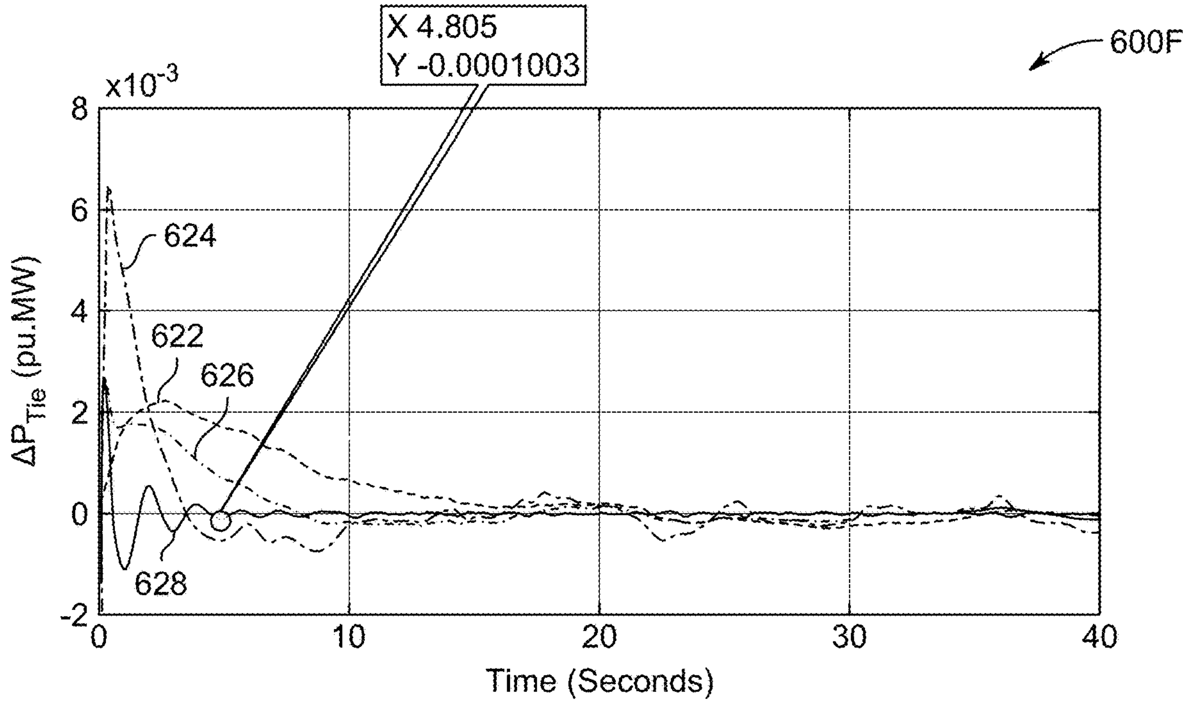

FIGS. 6E-6F illustrate exemplary graphical representations 600E, 600F of performance analysis of the controller at 3% SLV of $\Delta P_{Tie}$, according to certain embodiments.

The graphical representations 600E, and 600F show the performance analysis of the controller at 3% SLV of $\Delta P_{Tie}$. In the graphical representations 600E and 600F, X-axis represents time (t) in seconds, while Y-axis represents the $\Delta P_{Tie}$ in pμ.MW. Line 622 represents the MPC, line 624 represents the LADRC, line 626 represents MPC-LADRC, while line 628 represents 2DoF-MPC-LADRC. The graphical representation 600E and 600F shows the performance analysis of the controller at 3% SLV for the $\Delta P_{Tie}$.

The graphical representations 600A-600B, 600C-600D, and 600E-600F demonstrate that the 2DoF-MPC-LADRC controller exhibits superior transient behavior, characterized by reduced oscillatory magnitude and faster dynamic recovery when compared against other advanced control schemes, including the MPC-LADRC, the conventional MPC, and the LADRC. This evaluation is conducted to assess system stability and control precision under stringent operational conditions involving sudden load disturbances.

The 2DoF-MPC-LADRC controller illustrates improved robustness in mitigating overshoot (OS), undershoot (US), and achieving reduced settling time (ST). Under 3% SLV, the 2DoF-MPC-LADRC achieves settling times of approximately 5.085 seconds and 3.965 seconds for Area-1 and Area-2, respectively. The comparative quantitative performance assessment of the control strategies under 3% SLV is presented in Table 1.

TABLE 1

| Scheme | Response | $\Delta F_1$ | $\Delta F_2$ | $\Delta P_{Tie}$ |
|---|---|---|---|---|
| MPC-LADRC | ST | 5.085 | 3.965 | 4.805 |
| (Proposed) | US | 0.003 | 0.008 | 0.001 |
| | OS | 0.004 | 0.001 | 0.002 |
| MPC-LADRC | ST | 10.211 | 8.791 | 16.021 |
| | US | 0 | 0.012 | 0 |
| | OS | 0.005 | 0.005 | 0.002 |
| LADRC | ST | 11.211 | 4.360 | 10.200 |
| | US | 0 | 0.021 | 0.002 |
| | OS | 0.005 | 0.013 | 0.006 |

TABLE 1-continued

| Scheme | Response | $\Delta F_1$ | $\Delta F_2$ | $\Delta P_{Tie}$ |
|---|---|---|---|---|
| MPC | ST | 12.668 | 8.560 | 16.230 |
| | US | 0.003 | 0.005 | 0 |
| | OS | 0 | 0 | 0.002 |

Figure 7A:
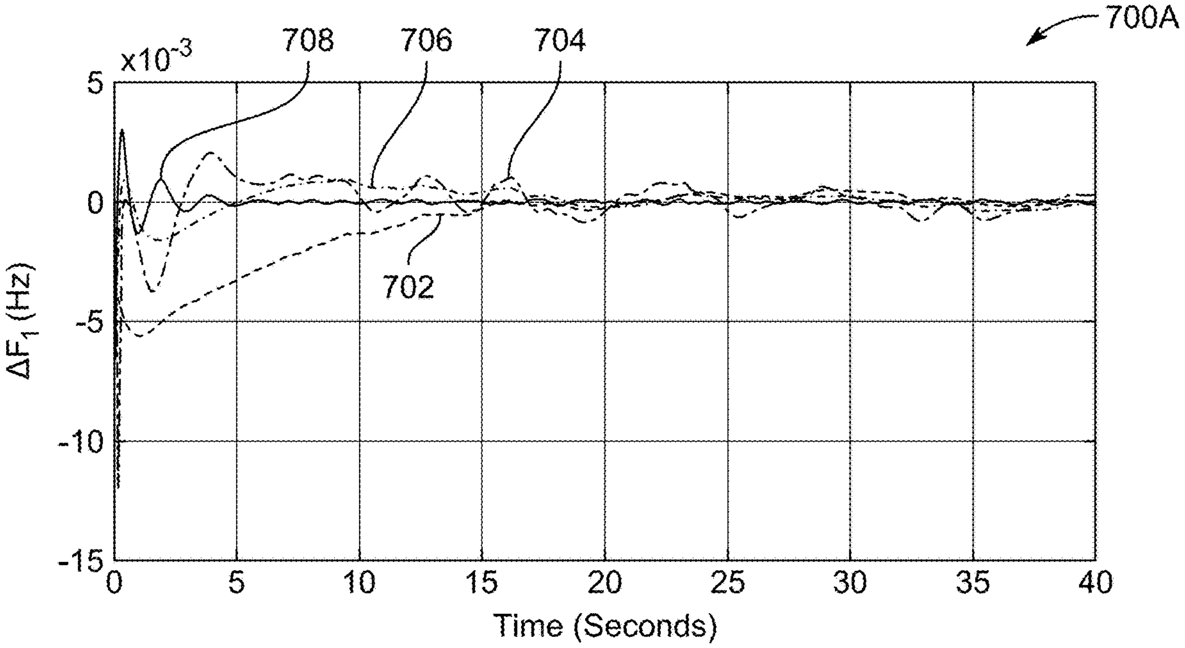
FIGS. 7A-7B illustrate exemplary graphical representations of the performance analysis of the controller at 5% SLV of $\Delta F_1$, according to certain embodiments.
Figure 7B:
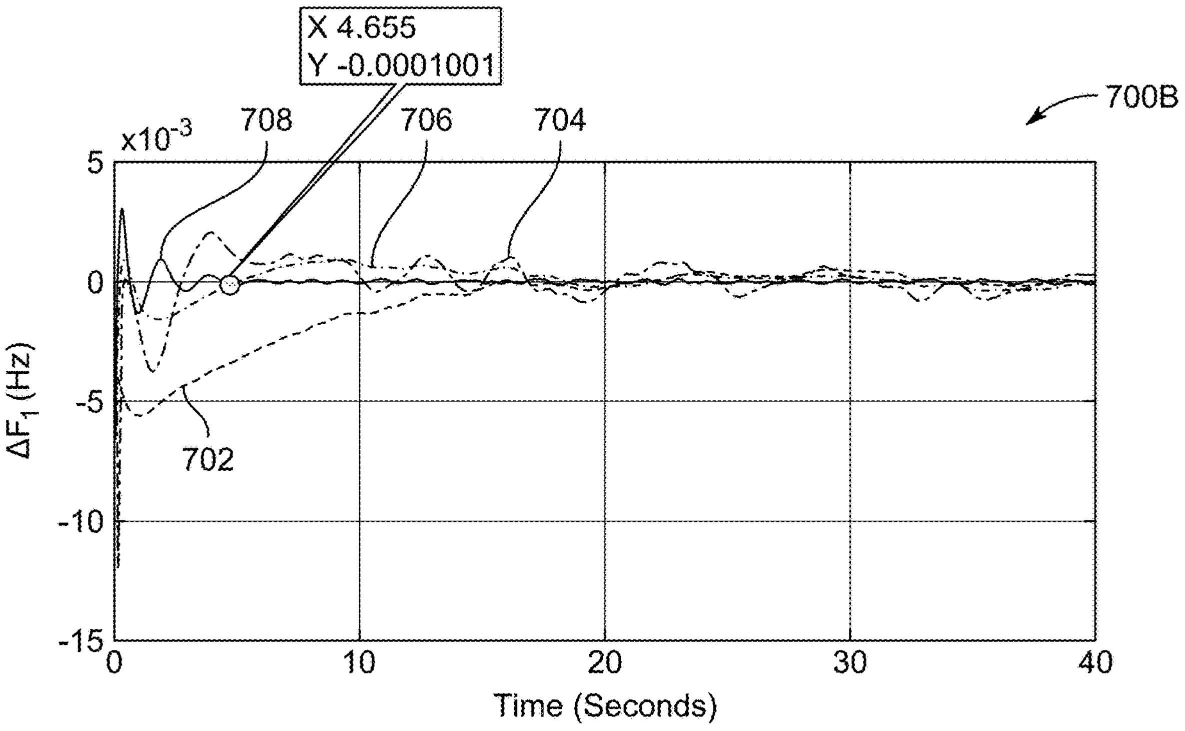

FIGS. 7A-7B illustrate exemplary graphical representations 700A, 700B of performance analysis of the controller at 5% SLV of $\Delta F_i$, according to certain embodiments.

The graphical representations 700A and 700B show the performance analysis of the controller at 5% SLV of $\Delta F_1$. In the graphical representations 700A and 700B, X-axis represents time (t) in seconds, while Y-axis represents the $\Delta F_1$ in Hz. Line 702 represents the MPC, line 704 represents the LADRC, line 706 represents MPC-LADRC, while line 708 represents 2DoF-MPC-LADRC. The graphical representation 700A and 700B shows the performance analysis of the controller at 5% SLV for the frequency $\Delta F_1$ regulation in Area-1.

Figure 7C:
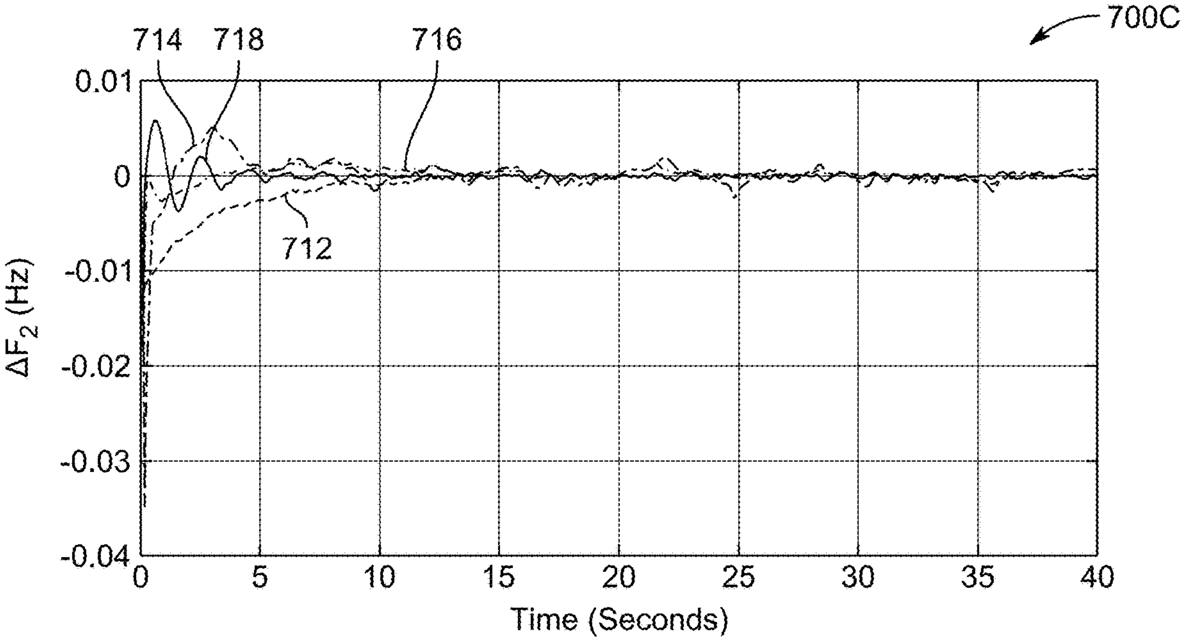
FIGS. 7C-7D illustrate exemplary graphical representations of the performance analysis of the controller at 5% SLV of $\Delta F_2$, according to certain embodiments.
Figure 7D:
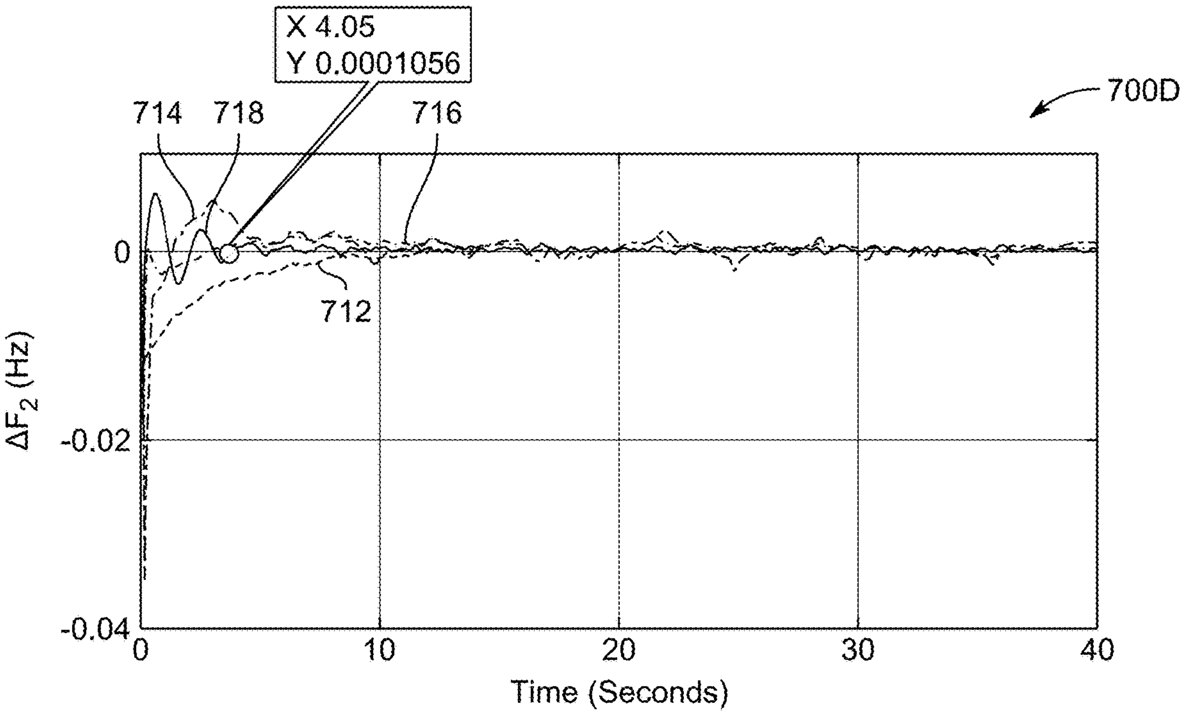

FIGS. 7C-7D illustrate exemplary graphical representations 700C, 700D of performance analysis of the controller at 5% SLV of $\Delta F_2$, according to certain embodiments.

The graphical representations 700C and 700D show the performance analysis of the controller at 5% SLV of $\Delta F_2$. In the graphical representations 700C and 700D, X-axis represents time (t) in seconds, while Y-axis represents the $\Delta F_2$ in Hz. Line 712 represents the MPC, line 714 represents the LADRC, line 716 represents MPC-LADRC, while line 718 represents 2DoF-MPC-LADRC. The graphical representation 700C and 700D shows the performance analysis of the controller at 5% SLV for the frequency $\Delta F_2$ regulation in Area-2.

Figure 7E:
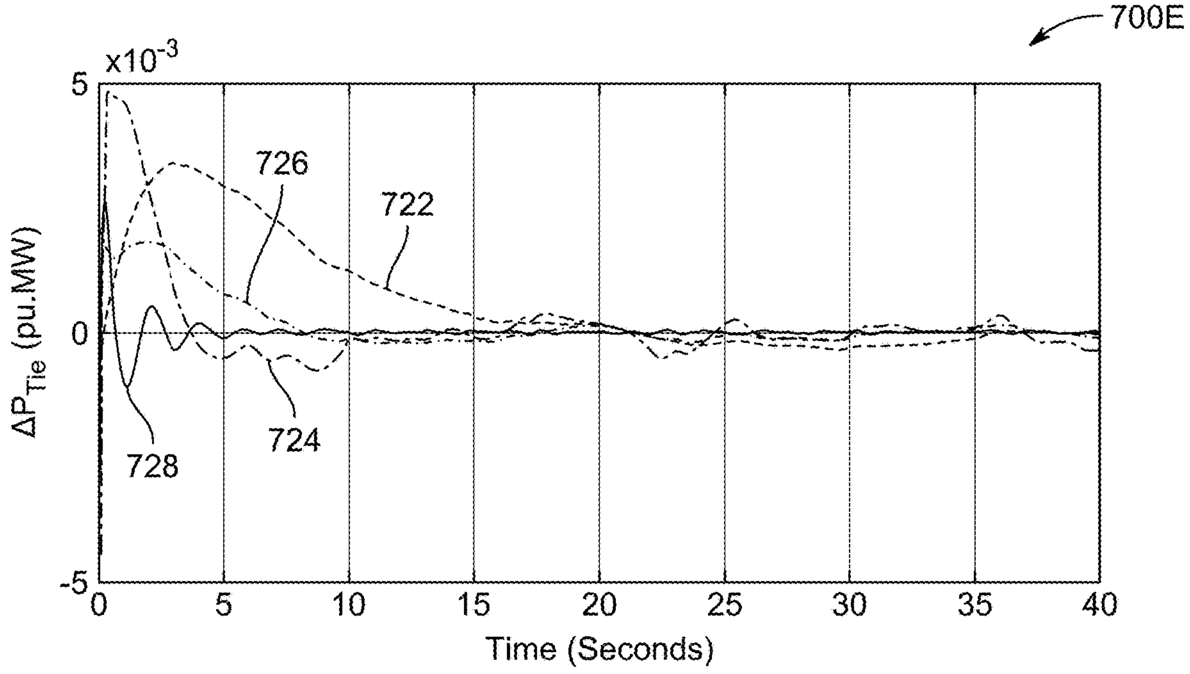
FIGS. 7E-7F illustrate exemplary graphical representations of the performance analysis of the controller at 5% SLV of $\Delta P_{Tie}$, according to certain embodiments.
Figure 7F:
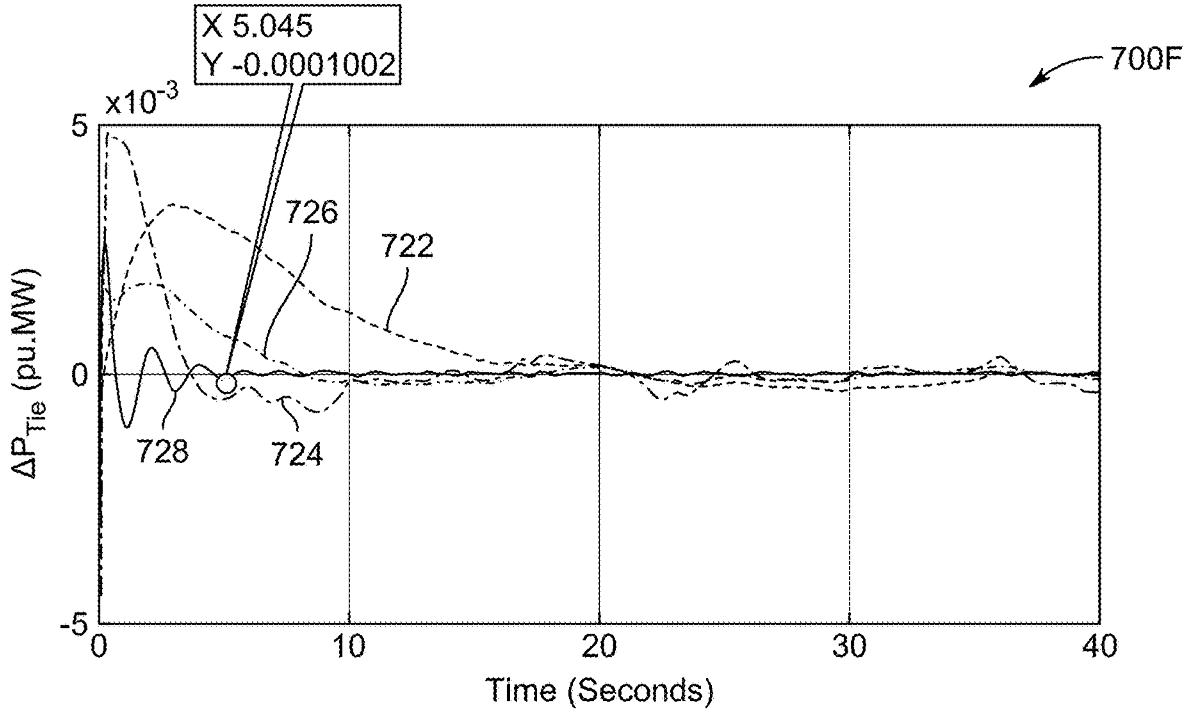

FIGS. 7E-7F illustrate exemplary graphical representations 700E, 700F of performance analysis of the controller at 5% SLV of $\Delta P_{Tie}$, according to certain embodiments.

The graphical representations 700E, and 700F show the performance analysis of the controller at 5% SLV of $\Delta P_{Tie}$. In the graphical representations 700E and 700F, X-axis represents time (t) in seconds, while Y-axis represents the $\Delta P_{Tie}$ in pμ.MW. Line 722 represents the MPC, line 724 represents the LADRC, line 726 represents MPC-LADRC, while line 728 represents 2DoF-MPC-LADRC. The graphical representation 700E and 700F shows the performance analysis of the controller at 5% SLV for the $\Delta P_{Tie}$.

As illustrated in FIGS. 7A-7B, 7C-7D, and 7E-7F, the 2DoF-MPC-LADRC demonstrates robust regulation of system frequency and tie-line power deviations under SLV conditions. In the case of a 5% SLV, the controller attains settling times of approximately 4.65 seconds and 4.05 seconds for Area-1 and Area-2, respectively. A comparative evaluation of the performance of various controllers under 5% SLV is presented in Table 2.

TABLE 2

| Scheme | Response | $\Delta F_1$ | $\Delta F_2$ | $\Delta P_{Tie}$ |
|---|---|---|---|---|
| MPC-LADRC | ST | 4.655 | 4.02 | 5.045 |
| (Proposed) | US | 0.006 | 0.013 | 0.005 |
| | OS | 0.004 | 0.005 | 0 |
| MPC-LADRC | ST | 18.320 | 5.112 | 7.761 |
| | US | 0.001 | 0.018 | 0 |
| | OS | 0.001 | 0 | 0.002 |
| LADRC | ST | 15.361 | 5.820 | 10.015 |
| | US | 0.012 | 0.035 | 0.004 |
| | OS | 0.004 | 0.005 | 0.005 |

TABLE 2-continued

| Scheme | Response | $\Delta F_1$ | $\Delta F_2$ | $\Delta P_{Tie}$ |
|---|---|---|---|---|
| MPC | ST | 16.001 | 11.890 | 18.308 |
| | US | 0.005 | 0.012 | 0 |
| | OS | 0 | 0 | 0.003 |

FIGS. 8A-8D illustrate exemplary graphical representations 800A, 800B, 800C and 800D of variable SLV evaluation of the load profile, $\Delta F_1$, $\Delta F_2$ and $\Delta P_{Tie}$, according to certain embodiments.

The present disclosure pertains to a simulation study performed on an interconnected power system (IPS) subjected to abrupt load fluctuation events. To assess the efficacy of the control scheme under such dynamic operating conditions, multiple performance evaluation parameters were employed, including frequency deviation and tie-line power exchange oscillations. The corresponding simulation results, illustrated in FIGS. 8A-8D, indicate that the Load Frequency Control (LFC) incorporating the 2DoF-MPC-LADRC demonstrates superior frequency regulation capability and improved overall dynamic stability in comparison with conventional and alternative control strategies.

The graphical representations 800A, 800B, 800C and 800D show variable SLV evaluation of the load profile, $\Delta F_1$, $\Delta F_2$ and $\Delta P_{Tie}$, respectively.

Figure 8A:
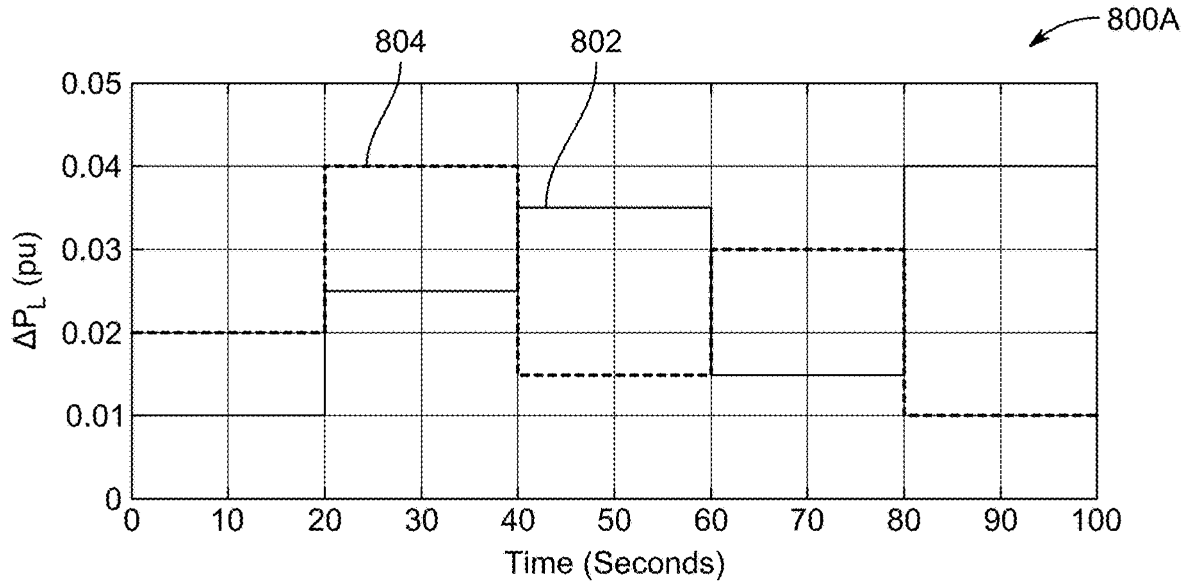
FIG. 8A illustrates an exemplary graphical representation of variable SLV evaluation of load profile, according to certain embodiments.
Figure 8B:
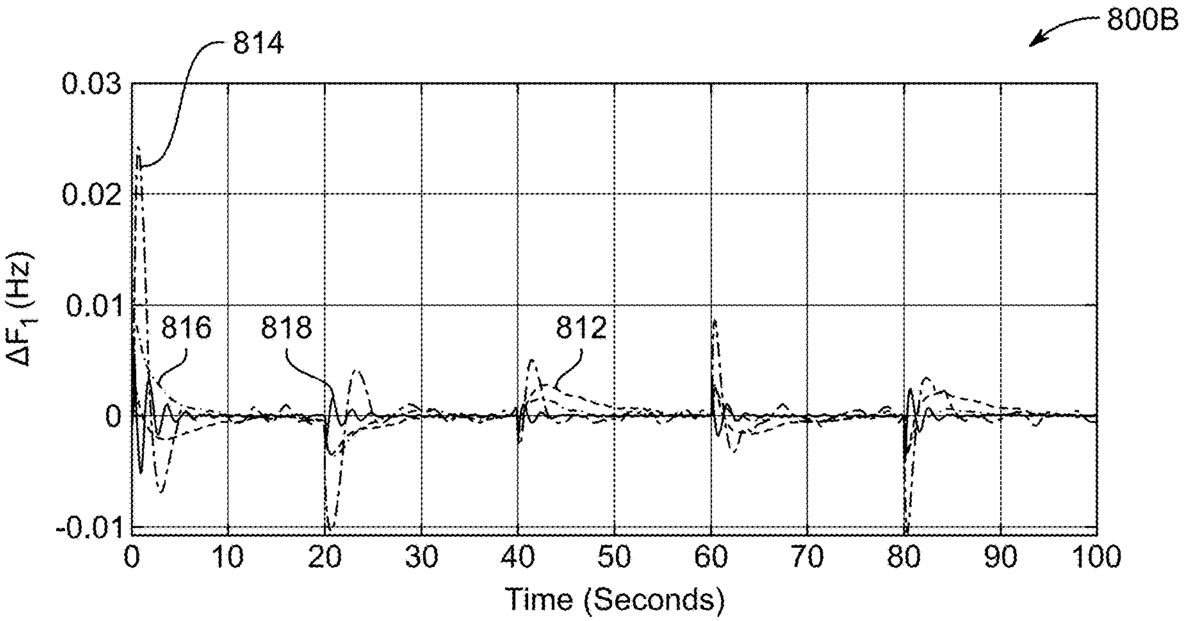
FIG. 8B illustrates an exemplary graphical representation of variable SLV evaluation of $\Delta F_1$, according to certain embodiments.
Figure 8C:
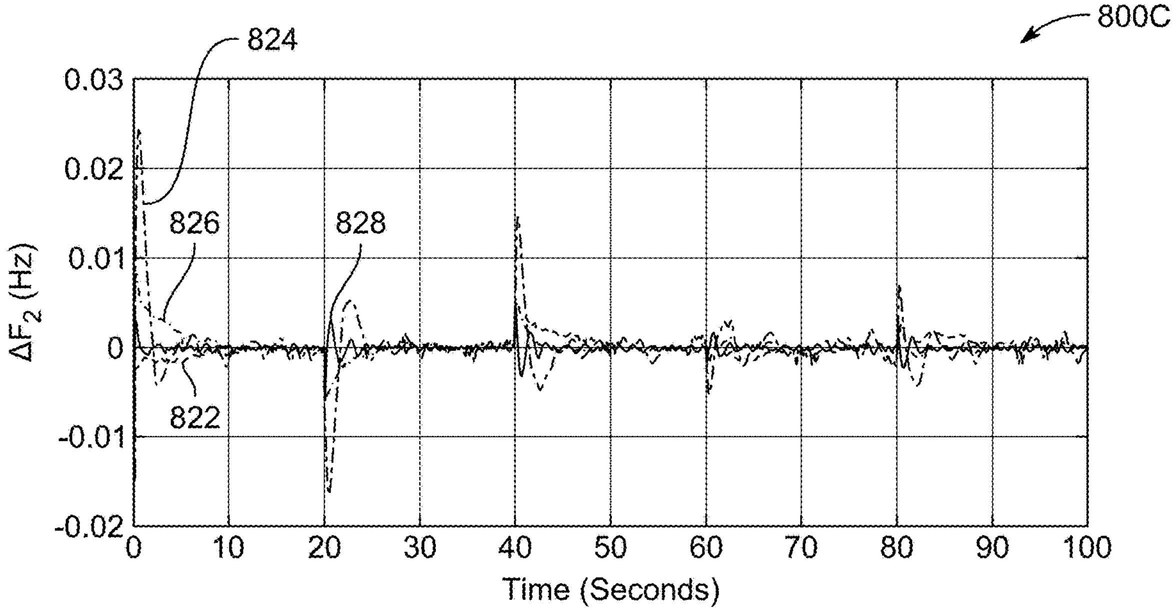
FIG. 8C illustrates an exemplary graphical representation of variable SLV evaluation of $\Delta F_2$, according to certain embodiments.
Figure 8D:
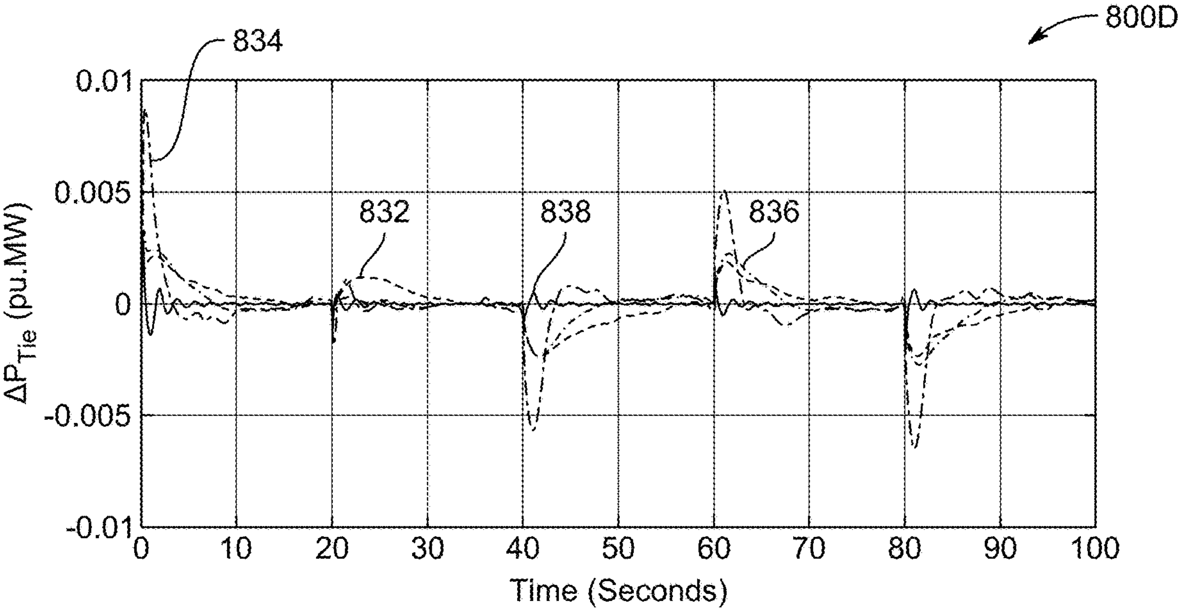
FIG. 8D illustrates an exemplary graphical representation of variable SLV evaluation of $\Delta P_{Tie}$, according to certain embodiments.

In the graphical representation 800A, X-axis represents time (t) in seconds, while Y-axis represents the load profile $\Delta P_L$ in p. Line 802 represents the Area-1 load, while line 804 represents Area-2 load. As illustrated in FIG. 8A, load change profiles are shown in both connected areas, i.e., Area-1 and Area-2.

In the graphical representation 800B, X-axis represents time (t) in seconds, while Y-axis represents the $\Delta F_1$ in Hz. Line 812 represents the MPC, line 814 represents the LADRC, line 816 represents MPC-LADRC, while line 818 represents 2DoF-MPC-LADRC. The graphical representation 800B shows the frequency $\Delta F_1$ regulation in Area-1.

In the graphical representation 800C, X-axis represents time (t) in seconds, while Y-axis represents the $\Delta F_2$ in Hz. Line 822 represents the MPC, line 824 represents the LADRC, line 826 represents MPC-LADRC, while line 828 represents 2DoF-MPC-LADRC. The graphical representation 800C shows the frequency $\Delta F_2$ regulation in Area-2.

In the graphical representation 800D, X-axis represents time (t) in seconds, while Y-axis represents the $\Delta P_{Tie}$ in pμ.MW. Line 832 represents the MPC, line 834 represents the LADRC, line 836 represents MPC-LADRC, while line 838 represents 2DoF-MPC-LADRC. The graphical representation 800D shows the $\Delta P_{Tie}$, i.e., power exchange between Area-1 and Area-2.

In an aspect, the controller is configured to maintain the frequency deviations of the interconnected power system (IPS) and the corresponding tie-line power oscillations within predetermined permissible operational thresholds during sudden or abrupt load change events. The controller ensures rapid corrective action and effective disturbance rejection to preserve system dynamic stability. In contrast, other controllers exhibit slower transient response characteristics (i.e., slower response time), resulting in delayed restoration of system parameters to their nominal operating values.

Figure 9:
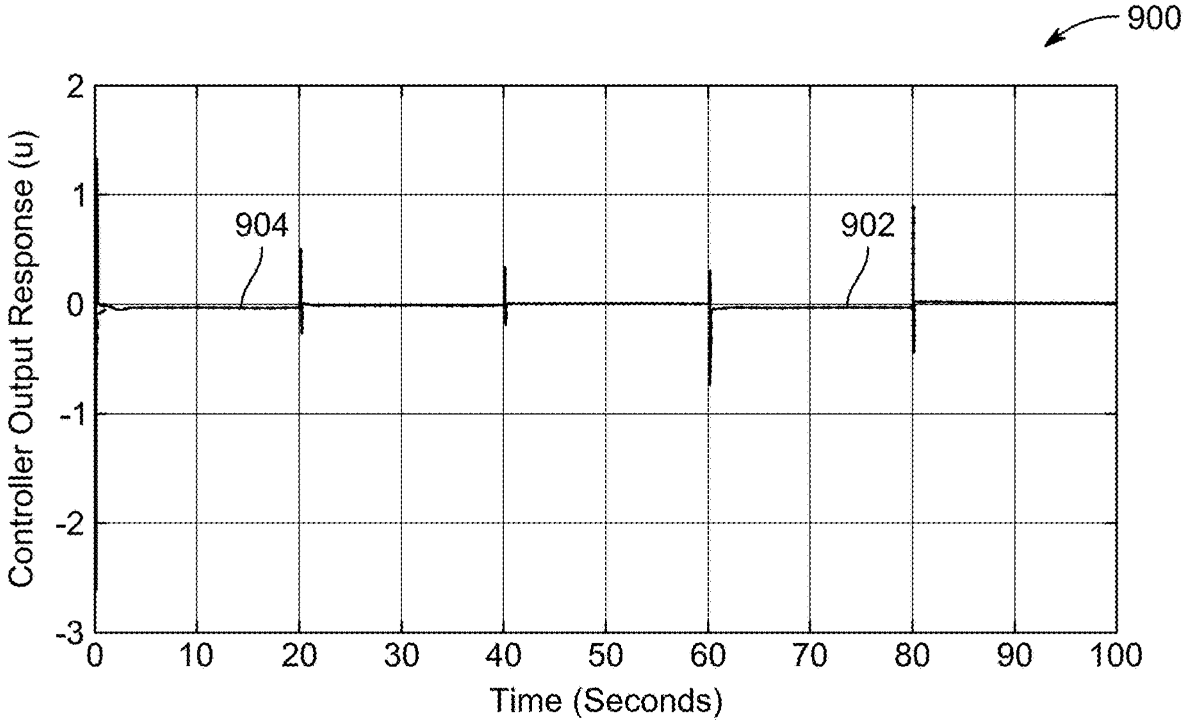
FIG. 9 illustrates an exemplary graphical representation of 2DoF-MPC-LADRC output response for variable step load, according to certain embodiments.
Figure 10A:
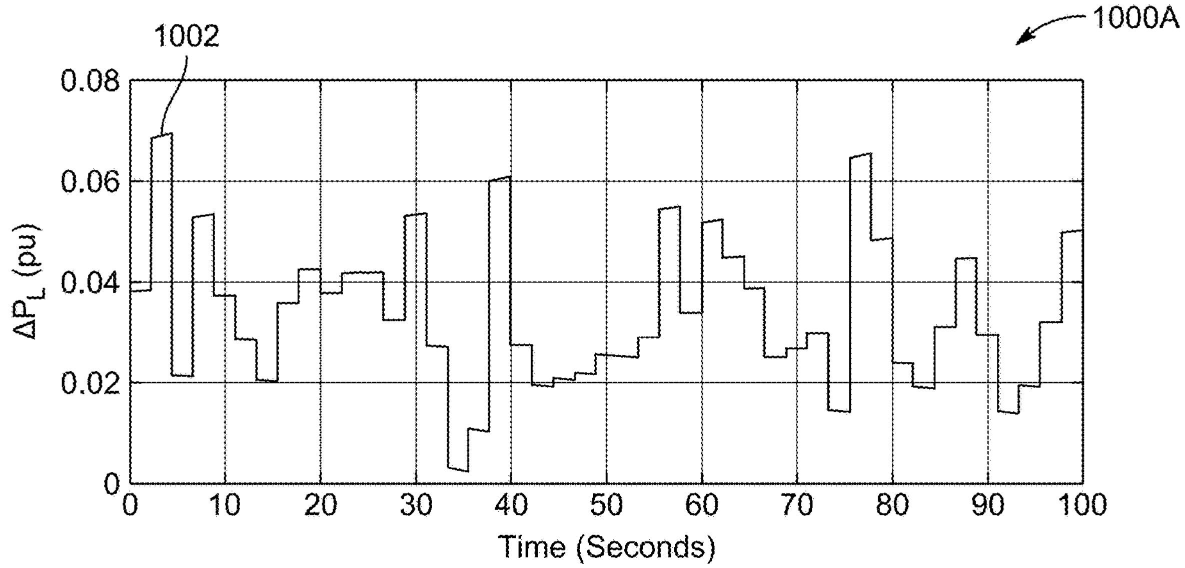
FIG. 10A illustrates an exemplary graphical representation of random fluctuation evaluation of the load profile, according to certain embodiments.
Figure 10B:
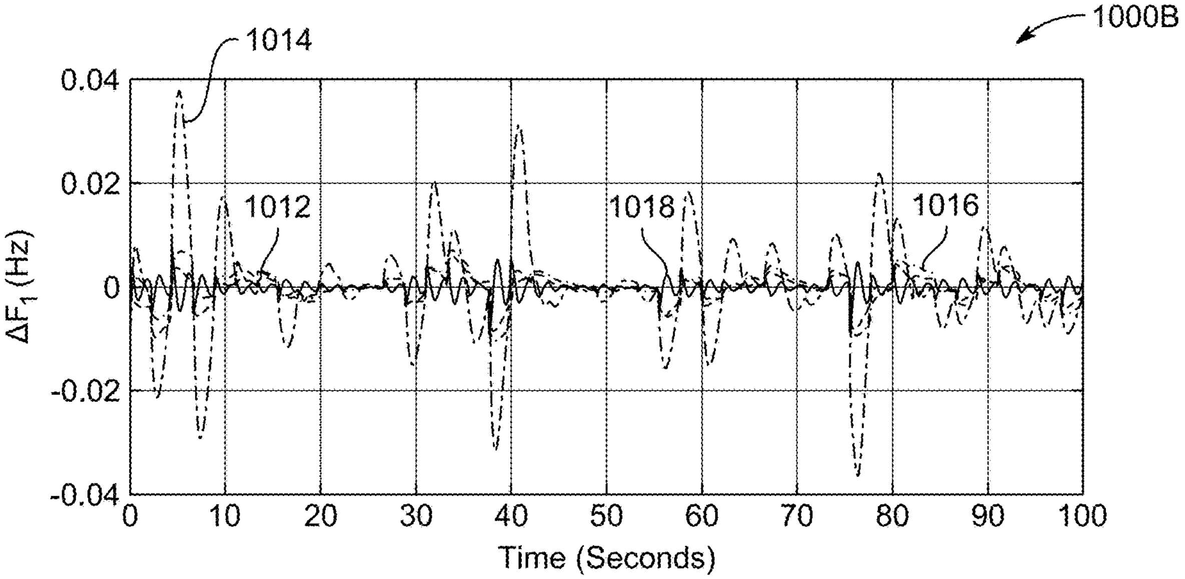
FIG. 10B illustrates an exemplary graphical representation of the random fluctuation evaluation of $\Delta F_1$, according to certain embodiments.
Figure 10C:
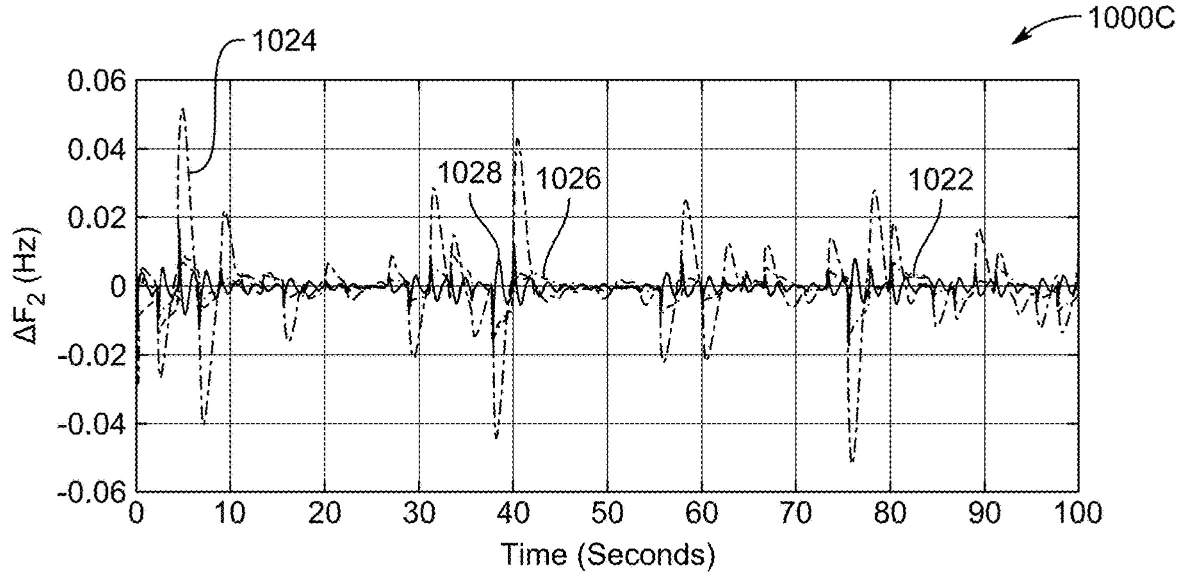
FIG. 10C illustrates an exemplary graphical representation of the random fluctuation evaluation of $\Delta F_2$, according to certain embodiments.
Figure 10D:
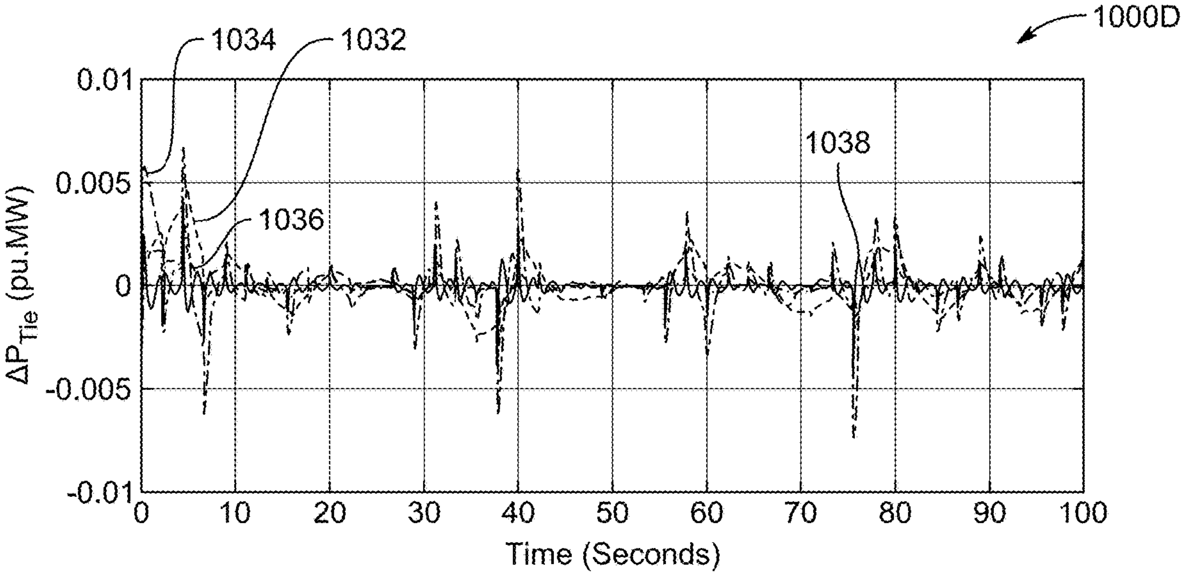
FIG. 10D illustrates an exemplary graphical representation of the random fluctuation evaluation of $\Delta P_{Tie}$, according to certain embodiments.

FIG. 9 illustrates an exemplary graphical representation 900 of 2DoF-MPC-LADRC output response for variable step load, according to certain embodiments.

In the graphical representation 900, X-axis represents time (t) in seconds, while Y-axis represents the 2DoF-MPC-LADRC controller output response in p. Line 902 represents the LADRC: Controller bandwidth $W_C$=15, while line 904 represents LADRC: Controller bandwidth $W_C$=5. The graphical representation shows the output characteristics of the 2DoF-MPC-LADRC controller. During the evaluation process, the controller bandwidth was systematically varied to determine the optimal operational performance level. The analysis indicates that the most favorable dynamic response and stability performance were achieved at a controller bandwidth of $W_C$=15.

FIGS. 10A-10D illustrate exemplary graphical representations 1000A, 1000B, 1000C, and 100D of random fluctuation evaluation of the load profile, $\Delta F_1$, $\Delta F_2$, and $\Delta P_{Tie}$, according to certain embodiments.

The random fluctuation evaluation is conducted to assess the robustness and effectiveness of the controller under continuously varying conditions and fluctuating power contributions from renewable energy sources (RESs).

The graphical representations 1000A, 1000B, 1000C and 1000D show random fluctuation evaluation of the load profile, $\Delta F_1$, $\Delta F_2$ and $\Delta P_{Tie}$, respectively.

In the graphical representation 1000A, X-axis represents time (t) in seconds, while Y-axis represents the $\Delta P_L$ in pμ. Line 1002 represents the Area-1 load, while line 804 represents load profile. The graphical representation 100B represents the random fluctuation evaluation of the load profile.

In the graphical representation 1000B, X-axis represents time (t) in seconds, while Y-axis represents the $\Delta F_1$ in Hz. Line 1012 represents the MPC, line 1014 represents the LADRC, line 1016 represents MPC-LADRC, while line 1018 represents 2DoF-MPC-LADRC. The graphical representation 1000B shows the random fluctuation evaluation of frequency $\Delta F_1$ in Area-1.

In the graphical representation 1000C, X-axis represents time (t) in seconds, while Y-axis represents the $\Delta F_2$ in Hz. Line 1022 represents the MPC, line 1024 represents the LADRC, line 1026 represents MPC-LADRC, while line 1028 represents 2DoF-MPC-LADRC. The graphical representation 1000C shows the random fluctuation evaluation of frequency $\Delta F_2$ in Area-2.

In the graphical representation 1000D, X-axis represents time (t) in seconds, while Y-axis represents the $\Delta P_{Tie}$ in pμ.MW. Line 1032 represents the MPC, line 1034 represents the LADRC, line 1036 represents MPC-LADRC, while line 1038 represents 2DoF-MPC-LADRC. The graphical representation 1000D shows the random fluctuation evaluation of $\Delta P_{Tie}$.

The obtained results from the random fluctuation evaluation demonstrate that the 2DoF-MPC-LADRC exhibits superior predictive regulation and disturbance rejection capabilities, thereby achieving enhanced dynamic performance compared to the other evaluated controllers.

Figure 11:
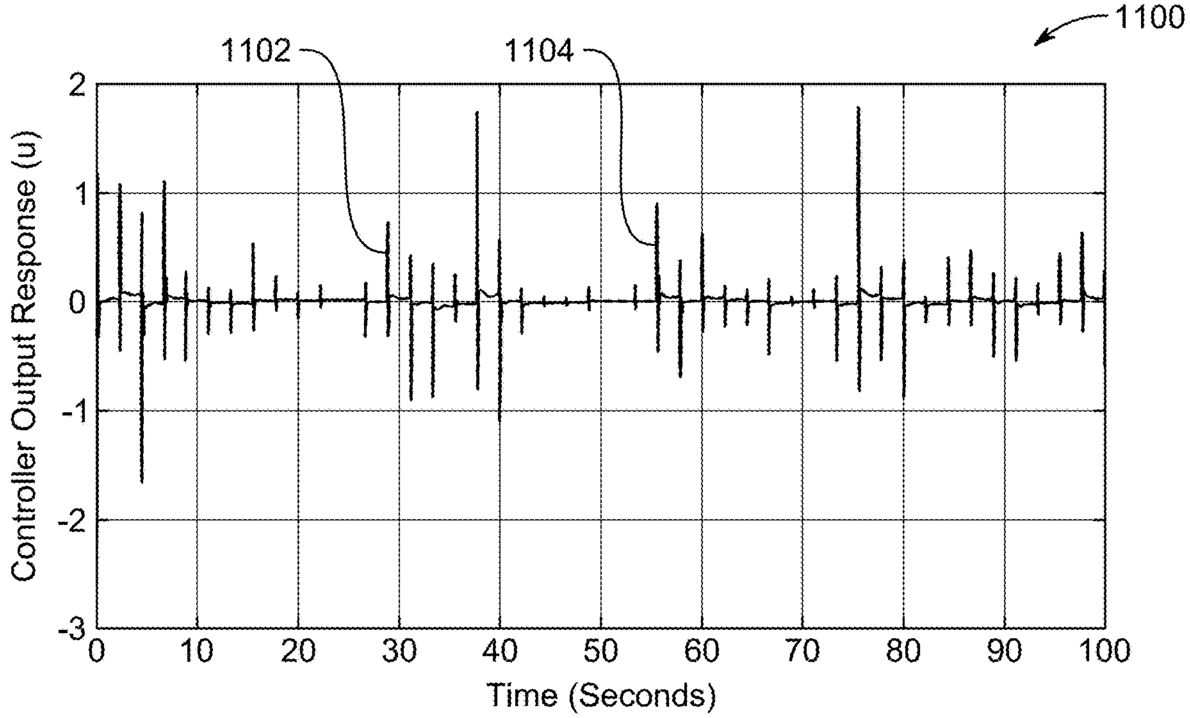
FIG. 11 illustrates an exemplary graphical representation of the 2DoF-MPC-LADRC output response for random load change, according to certain embodiments.

FIG. 11 illustrates an exemplary graphical representation 1100 of the 2DoF-MPC-LADRC output response for random load change, according to certain embodiments.

In the graphical representation 1100, X-axis represents time (t) in seconds, while Y-axis represents the controller output response in p. Line 11002 represents the LADRC: Controller bandwidth $W_C$=15, while line 1104 represents the LADRC:Controller bandwidth $W_C$=5. The graphical representation 100B represents the capability of the controller to dynamically adjust its control effort and provide compensatory regulation in the presence of stochastic load disturbances. The depicted response confirms that the controller effectively maintains stable system operation by suppressing transient deviations and minimizing oscillatory behavior within the interconnected power system.

FIGS. 12A-12C illustrate exemplary graphical representations 1200A, 1200B, and 1200C of sensitivity analysis response of the 2DoF-MPC-LADRC of $\Delta F_1$, $\Delta F_2$, and $\Delta P_{Tie}$, respectively, according to certain embodiments.

A robustness evaluation of the controller is performed through sensitivity analysis under parameter perturbations within the power system (PS). Sensitivity analysis is directed toward determining the reliability and stability sustaining capability of the controller when subjected to variations in system parameters and operating conditions. For stable operation of the interconnected power system (IPS), the controller may effectively accommodate substantial fluctuations in load demand. The controller lacking sufficient robustness may exhibit instability under irregular load patterns, resulting in prolonged frequency undershoots and overshoots and subsequent degradation of system performance.

The graphical representations 1200A, 1200B, and 1200C show sensitivity analysis response of $\Delta F_1$, $\Delta F_2$ and $\Delta P_{Tie}$, respectively.

In the graphical representation 1200A, X-axis represents time (t) in seconds, while Y-axis represents the $\Delta F_1$ in Hz. Line 1202 represents +40% change in parameters, line 1204 represents normal parameters, while line 1206 represents −40% change in parameters. The graphical representation 1200A shows the sensitivity analysis response of 2DoF-MPC-LADRC of frequency $\Delta F_1$ in Area-1.

In the graphical representation 1200B, X-axis represents time (t) in seconds, while Y-axis represents the $\Delta F_2$ in Hz. Line 1212 represents +40% change in parameters, line 1214 represents normal parameters, while line 1216 represents −40% change in parameters. The graphical representation 1200B shows the sensitivity analysis response of 2DoF-MPC-LADRC of frequency $\Delta F_2$ in Area-2.

In the graphical representation 1200C, X-axis represents time (t) in seconds, while Y-axis represents the $\Delta P_{Tie}$ in pμ.MW. Line 1222 represents +40% change in parameters, line 1224 represents normal parameters, while line 1226 represents −40% change in parameters. The graphical representation 1000D shows 1200B shows the sensitivity analysis response of 2DoF-MPC-LADRC of $\Delta P_{Tie}$.

To assess the robustness of the 2DoF-MPC-LADRC, key dynamic parameters, including the governor time constant and turbine time constant, are varied by 40% from their nominal values. The resulting system response is analyzed to verify the controller's ability to preserve frequency stability and maintain acceptable dynamic behavior under such perturbations FIGS. 13A-13C illustrate exemplary graphical representations 1300A, 1300B and 1300C of sources impact analysis of the 2DoF-MPC-LADRC of $\Delta F_1$, $\Delta F_2$, and $\Delta P_{Tie}$, respectively, according to certain embodiments.

Impact analysis is performed to evaluate the dynamic behavior of a multi-area interconnected power system incorporating thermal generation units, the RESs, the RFB, and the SSSC. This scenario accounts for the inherent variability and intermittency associated with the power output of RESs while assessing the transient stability of the system. FIG. 12 illustrates the corresponding power variations associated with photovoltaic (PV) generation, wind generation, the RFB, and the SSSC.

The graphical representations 1300A, 1300B, and 1300C show the sources' impact analysis of the 2DoF-MPC-LADRC of $\Delta F_1$, $\Delta F_2$ and $\Delta P_{Tie}$, respectively.

In the graphical representation 1300A, X-axis represents time (t) in seconds, while Y-axis represents the $\Delta F_1$ in Hz. Line 1302 represents thermal+PV+Wind, line 1304 represents thermal+PV+Wind+RFB, while line 1206 represents thermal+PV+Wind+RFB+SSSC. The graphical representation 1300A shows the source impact analysis of 2DoF-MPC-LADRC of frequency $\Delta F_1$ in Area-1.

In the graphical representation 1300B, X-axis represents time (t) in seconds, while Y-axis represents the $\Delta F_2$ in Hz. Line 1312 represents thermal+PV+Wind, line 1314 represents thermal+PV+Wind+RFB, while line 1316 represents thermal+PV+Wind+RFB+SSSC. The graphical representation 1300B shows the source impact analysis of 2DoF-MPC-LADRC of frequency $\Delta F_2$ in Area-2.

In the graphical representation 1300C, X-axis represents time (t) in seconds, while Y-axis represents the $\Delta P_{Tie}$ in pμ.MW. Line 1312 represents thermal+PV+Wind, line 1314 represents thermal+PV+Wind+RFB, while line 1316 represents thermal+PV+Wind+RFB+SSSC. The graphical representation 1300B shows the source impact analysis of 2DoF-MPC-LADRC of $\Delta P_{Tie}$.

In an aspect, the controller is subjected to frequency disturbance suppression testing to assess its capability to maintain system stability under these multi-source interactions. The RFB and SSSC contribute to frequency stabilization by absorbing and releasing energy as required to counteract fluctuations. Without appropriate compensation, the frequency oscillations corresponding to both the inter-area mode and the inertia center mode may become significant and insufficiently damped. The initial frequency overshoot is reduced through the application of the SSSC, while the gradual frequency deviation associated with the inertia center mode, arising from imbalance between generation and demand, is managed through coordinated governor action enabled by the controller.

In an aspect, the present disclosure introduces a controller based on the 2DoF-MPC-LADRC for effective operational regulation of the interconnected power system (IPS). The predictive control and disturbance-rejection capabilities of the controller enable efficient handling of load fluctuations and parametric uncertainties within the power system. Furthermore, the control performance of the conventional MPC framework is enhanced through its transformation into a two-degrees-of-freedom structure, where the 2DoF-MPC component evaluates both the area control error (ACE) and load perturbations, thereby improving response adaptability. The integration of 2DoF-MPC with LADRC provides enhanced mitigation of frequency oscillations across the IPS.

Additionally, the present disclosure incorporates the SSSC into the tie-line power flow mathematical model, where the SSSC-based damping controller is employed to strengthen the dynamic performance and resilience of the AGC mechanism. The IPS configuration further includes RESs and the RFB to evaluate their influence on overall system frequency behavior.

The controller demonstrates robust frequency regulation performance, achieving response times of approximately 5.085 seconds and 3.965 seconds at 3% step load variation (SLV) and 4.65 seconds and 4.05 seconds at 5% SLV, outperforming the comparative control strategies. The robustness of the 2DoF-MPC-LADRC is further verified under thermal power system parameter variations of up to +40%, confirming its capability to sustain stable operation under significant load disturbances and system uncertainties.

Figure 14:
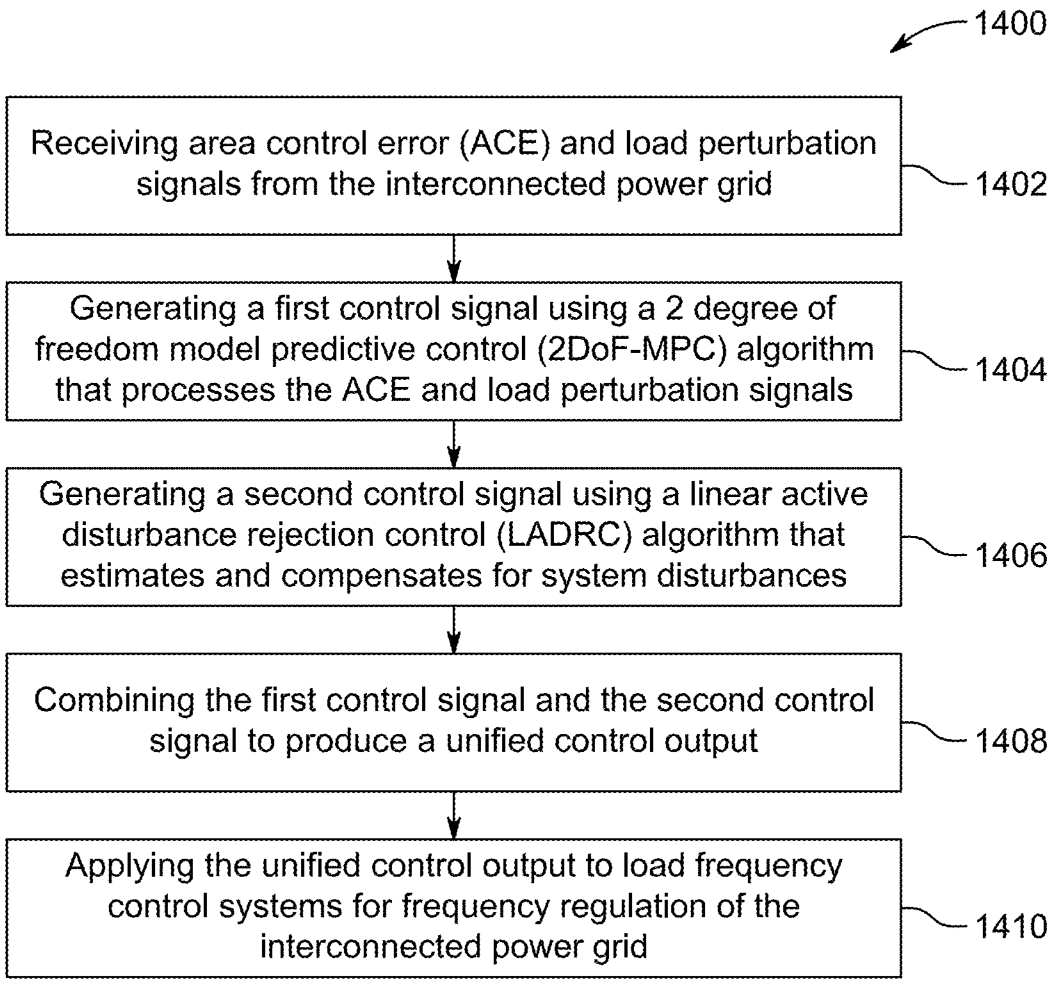
FIG. 14 illustrates an exemplary flow diagram of a method for hybrid frequency control in the interconnected power grids, according to certain embodiments.

FIG. 14 illustrates an exemplary flow diagram 1400 of a method for hybrid frequency control in the interconnected power grids, according to certain embodiments.

At step 1402, the method 1400 includes receiving area control error (ACE) and load perturbation signals from the interconnected power grid. In an aspect, the interconnected power grid comprises renewable energy sources, energy storage systems, and flexible AC transmission system (FACTS) devices. The renewable energy sources comprise, but are not limited to, photovoltaic arrays or cells, wind turbines, and solar panels. The energy storage systems comprise, but are not limited to, a battery energy storage system, a redox flow battery, a capacitor energy storage unit, a flywheel energy storage system, and a hydroelectric storage system. the FACTS devices comprise, but are not limited to, a static synchronous series compensator (SSSC), a static var compensator (SVC), and a static synchronous compensator (STATCOM).

In an aspect, the ACE signal represents the deviation between scheduled and actual tie-line power exchange, along with local frequency deviation. The load perturbation signal reflects variations in real power demand within the respective control areas. Together, the ACE and load perturbation signals serve as inputs for hybrid frequency control to restore system equilibrium and maintain stable grid operation.

At step 1404, method 1400 includes generating a first control signal using a two-degree-of-freedom model predictive control (2DoF-MPC) algorithm that processes the ACE and load perturbation signals. The first control signal is generated using 2DoF-MPC algorithm At step 1406, the method 1400 includes generating a second control signal using a linear active disturbance rejection control (LADRC) algorithm that estimates and compensates for system disturbances. The second control signal, comprising estimated system states and disturbances, is generated using an extended state observer (ESO). The system states and disturbances are generated by observing both internal system dynamics and external load disturbances.

In an aspect, the generation of the second control signal comprises generating state feedback control signals based on the estimated states and actively rejecting the estimated disturbances through disturbance compensation.

At step 1408, the method 1400 includes combining the first control signal and the second control signal to produce a unified control output. In an aspect, generating the second control signal comprises estimating system states and disturbances using an extended state observer (ESO).

In an aspect, combining the first control signal and the second control signal comprises weighing each signal based on real-time system operating conditions.

At step 1410, the method 1400 includes applying the unified control output to load frequency control systems for frequency regulation of the interconnected power grid.

In an aspect, estimating system states and disturbances comprises observing both internal system dynamics and external load disturbances.

The method 1400 further comprises optimizing control parameters of the 2DoF-MPC and LADRC based on system performance metrics.

Figure 15:
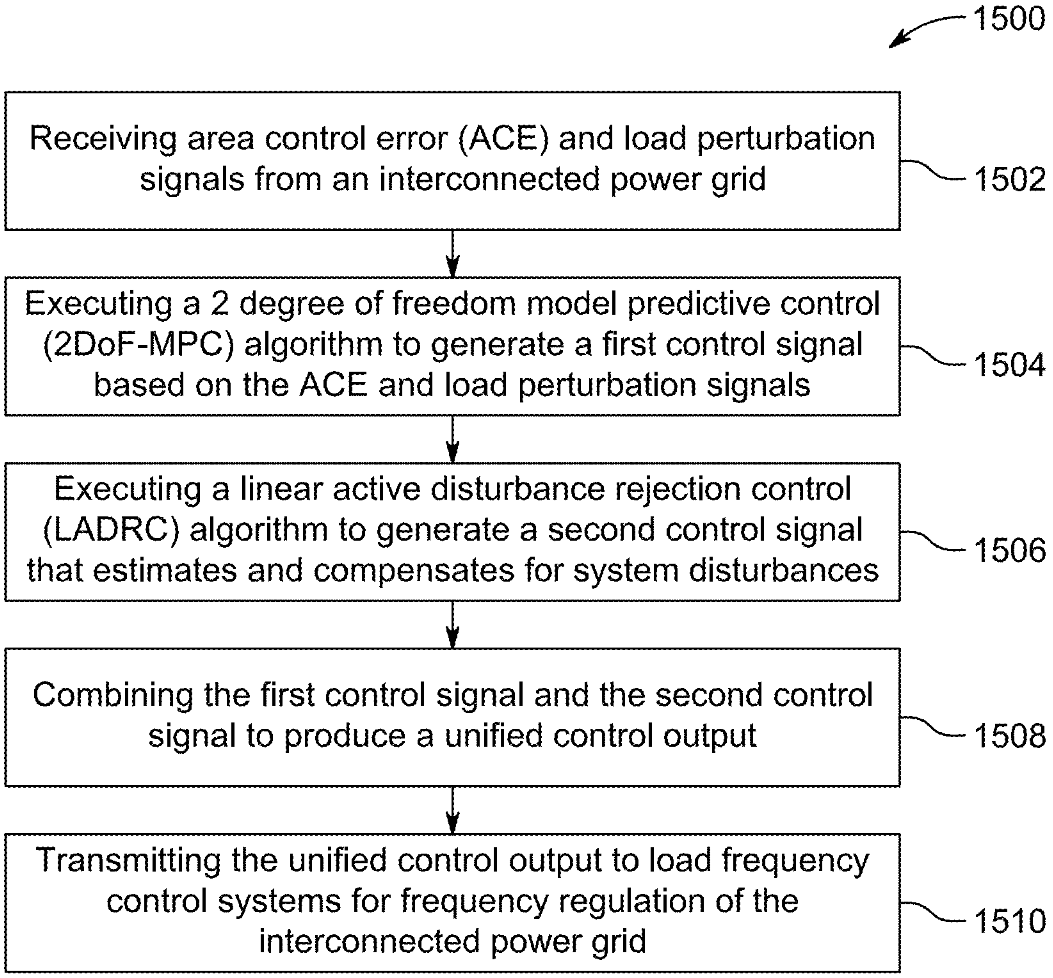
FIG. 15 illustrates an exemplary flow diagram of a non-transitory computer readable medium storing instructions that are executed by a processor for hybrid frequency control in the interconnected power grids, according to certain embodiments.

FIG. 15 illustrates an exemplary flow diagram 1500 of a non-transitory computer readable medium storing instruction that are executed by a processor for hybrid frequency control in the interconnected power grids, according to certain embodiments.

At step 1502, the processor receives area control error (ACE) and load perturbation signals from an interconnected power grid.

At step 1504, the processor executes a 2 degree of freedom model predictive control (2DoF-MPC) algorithm to generate a first control signal based on the ACE and load perturbation signals.

At step 1506, the processor executes a linear active disturbance rejection control (LADRC) algorithm to generate a second control signal that estimates and compensates for system disturbances. In an aspect, in the execution of the LADRC algorithm, the processor implements an extended state observer (ESO) to estimate system states and disturbances. The processor generates state feedback control signals based on the estimated states. The processor performs disturbance compensation to actively reject the estimated disturbances.

At step 1508, the processor combines the first control signal and the second control signal to produce a unified control output. Combining the first control signal and the second control signal comprises applying weighting factors to each signal based on current power grid operating conditions.

At step 1510, the processor transmits the unified control output to load frequency control systems for frequency regulation of the interconnected power grid.

The operations further comprise controlling frequency oscillations in a power grid comprising renewable energy sources, energy storage systems, and flexible AC transmission system (FACTS) devices.

The first embodiment is illustrated with respect to FIG. 1. The first embodiment describes a hybrid frequency control system 102 for interconnected power grids. The hybrid frequency control system 102 comprises a 2 degree of freedom model predictive controller (2DoF-MPC) 104 configured to receive area control error (ACE) and load perturbation signals and generate a first control signal based on predictive control algorithms. A linear active disturbance rejection controller (LADRC) 106 is configured to estimate and reject internal and external disturbances in the power grid and generate a second control signal. A signal combiner 108 is configured to combine the first control signal and the second control signal to produce a unified control output for frequency regulation of the interconnected power grid.

In an aspect, the LADRC 106 comprises an extended state observer (ESO) 110 configured to estimate system states and disturbances, a state feedback controller 112 configured to generate control signals based on estimated states, and a disturbance compensation module 114 configured to actively reject estimated disturbances.

In an aspect, the system 102 is configured to control frequency oscillations in a power grid comprising renewable energy sources, energy storage systems, and flexible AC transmission system (FACTS) devices.

In an aspect, the extended state observer (ESO) 110 is configured to estimate both measured and unmeasured disturbances affecting the power grid.

In an aspect, the 2DoF-MPC 104 is configured to process the ACE and load perturbation signals using a prediction horizon and control horizon to optimize future control actions.

In an aspect, the signal combiner 108 is configured to weigh the first control signal and the second control signal based on system operating conditions.

In an aspect, the renewable energy sources comprise photovoltaic (PV) systems and wind turbine generators.

In an aspect, the energy storage systems comprise redox flow battery (RFB) systems.

In an aspect, the FACTS devices comprise static synchronous series compensators (SSSC).

In an aspect, the system 102 is configured to operate in a multi-area interconnected power grid with tie-line power flow control.

The second embodiment is illustrated with respect to FIG. 14. The second embodiment describes a method for hybrid frequency control in interconnected power grids. The method 1400 comprises receiving area control error (ACE) and load perturbation signals from the interconnected power grid. The method 1400 comprises generating a first control signal using a 2 degree of freedom model predictive control (2DoF-MPC) algorithm that processes the ACE and load perturbation signals. The method 1400 comprises generating a second control signal using a linear active disturbance rejection control (LADRC) algorithm that estimates and compensates for system disturbances. The method 1400 comprises combining the first control signal and the second control signal to produce a unified control output. The method 1400 comprises applying the unified control output to load frequency control systems for frequency regulation of the interconnected power grid.

In an aspect, the method 1400 comprises generating the second control signal. The generation of the second control signal comprises estimating system states and disturbances using an extended state observer (ESO), generating state feedback control signals based on the estimated states, and actively rejecting the estimated disturbances through disturbance compensation.

In an aspect, the interconnected power grid comprises renewable energy sources, energy storage systems, and flexible AC transmission system (FACTS) devices.

In an aspect, the method 1400 comprises combining the first control signal and the second control signal comprises weighting each signal based on real-time system operating conditions.

In an aspect, the method 1400 comprises estimating system states and disturbances comprises observing both internal system dynamics and external load disturbances.

In an aspect, the method 1400 comprises optimizing control parameters of the 2DoF-MPC and LADRC based on system performance metrics.

The third embodiment is illustrated with respect to FIG. 15. The third embodiment describes a non-transitory computer-readable medium storing instructions that, when executed by a processor, cause the processor to perform operations that comprise, at step 1502, receiving area control error (ACE) and load perturbation signals from an interconnected power grid. The processor, at step 1504, executes a 2 degree of freedom model predictive control (2DoF-MPC) algorithm to generate a first control signal based on the ACE and load perturbation signals. The processor, at step 1506, executes a linear active disturbance rejection control (LADRC) algorithm to generate a second control signal that estimates and compensates for system disturbances. The processor, at step 1508, combines the first control signal and the second control signal to produce a unified control output. The processor, at step 1510, transmit the unified control output to load frequency control systems for frequency regulation of the interconnected power grid.

In an aspect, executing the LADRC algorithm comprises implementing an extended state observer (ESO) to estimate system states and disturbances, generating state feedback control signals based on the estimated states and performing disturbance compensation to actively reject the estimated disturbances.

In an aspect, the operations further comprise controlling frequency oscillations in a power grid comprising renewable energy sources, energy storage systems, and flexible AC transmission system (FACTS) devices.

In an aspect, the operations further comprise combining the first control signal and the second control signal, which comprises applying weighting factors to each signal based on the current power grid operating condition.

Figure 16:
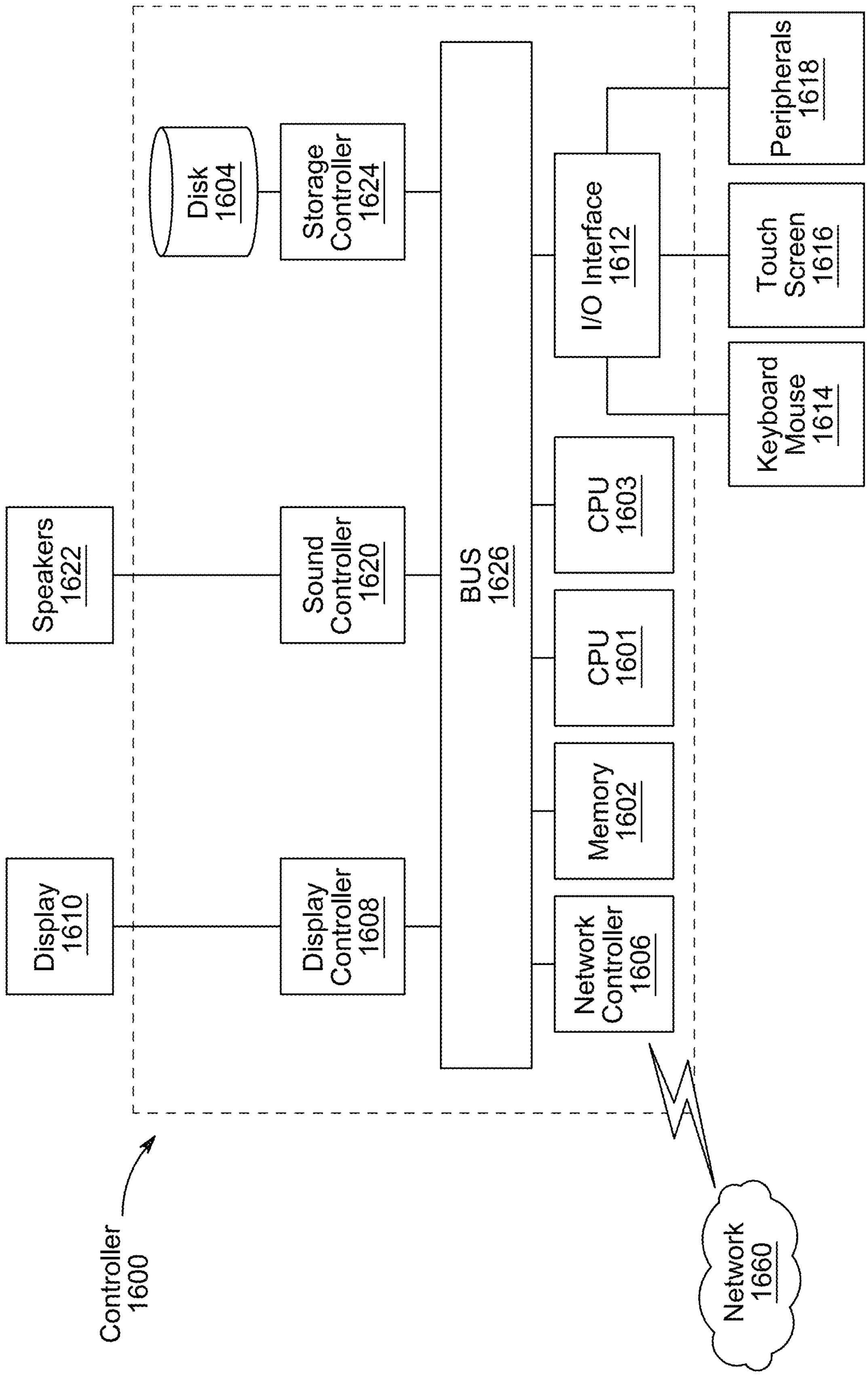
FIG. 16 is an illustration of a non-limiting example of details of computing hardware used in a computing system, according to certain embodiments.

Next, further details of the hardware description of the computing environment according to exemplary embodiments are described with reference to FIG. 1600. In FIG. 16, a controller 1600 includes a CPU 1601 which performs the processes described above/below. The process data and instructions may be stored in memory 1602. These processes and instructions may also be stored on a storage medium disk 1604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1601, 1603 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1601 or CPU 1603 may be a Xenon or Core processor from Intel of America or an Opteron processor from AMD of America, or may be other processor types that would be recognized by one of ordinary skill in the art. Alternatively, the CPU 1601, 1603 may be implemented on an FPGA, ASIC, PLD or using discrete logic circuits, as one of ordinary skill in the art would recognize. Further, CPU 1601, 1603 may be implemented as multiple processors cooperatively working in parallel to perform the instructions of the inventive processes described above.

The computing device in FIG. 16 also includes a network controller 1606, such as an Intel Ethernet PRO network interface card from Intel Corporation of America, for interfacing with network 1660. As can be appreciated, the network 1660 can be a public network, such as the Internet, or a private network, such as an LAN or WAN network, or any combination thereof and can also include PSTN or ISDN sub-networks. The network 1660 can also be wired, such as an Ethernet network, or can be wireless, such as a cellular network including EDGE, 3G, 4G and 5G wireless cellular systems. The wireless network can also be WiFi, Bluetooth, or any other wireless form of communication that is known.

The computing device further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a keyboard and/or mouse 1614 as well as a touch screen panel 1816 on or separate from display 1610. General purpose I/O interface also connects to a variety of peripherals including printers and scanners, such as an OfficeJet or DeskJet from Hewlett Packard.

A sound controller 1620 is also provided in the computing device such as Sound Blaster X-Fi Titanium from Creative, to interface with speakers/microphone 1622 thereby providing sounds and/or music.

The general-purpose storage controller 1624 connects the storage medium disk 1604 with communication bus 1626, which may be an ISA, EISA, VESA, PCI, or similar, for interconnecting all of the components of the computing device. A description of the general features and functionality of the display 1610, keyboard and/or mouse 1614, as well as the display controller 1606, storage controller 1624, network controller 1606, sound controller 1620, and general purpose I/O interface 1612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 17.

Figure 17:
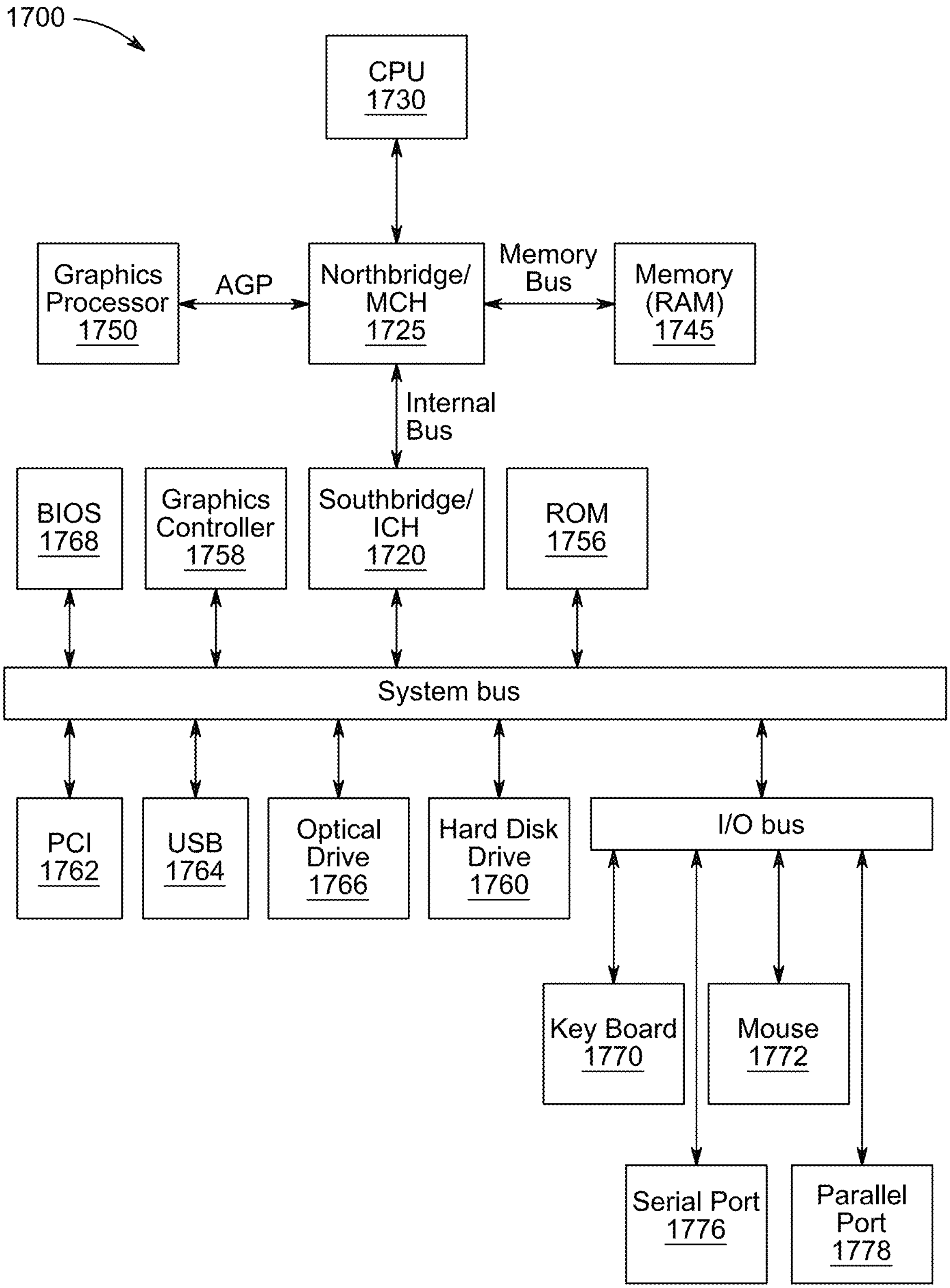
FIG. 17 is an exemplary schematic diagram of a data processing system used within the computing system, according to certain embodiments.

FIG. 17 shows a schematic diagram of a data processing system 1700, according to certain embodiments, for performing the functions of the exemplary embodiments. The data processing system 1700 is an example of a computer in which code or instructions implementing the processes of the illustrative embodiments may be located.

In FIG. 17, the data processing system 1700 employs a hub architecture including a north bridge and memory controller hub (NB/MCH) 1725 and a south bridge and input/output (I/O) controller hub (SB/ICH) 1720. The central processing unit (CPU) 1730 is connected to NB/MCH 1725. The NB/MCH 1725 also connects to the memory 1745 via a memory bus and connects to the graphics processor 1750 via an accelerated graphics port (AGP). The NB/MCH 1725 also connects to the SB/ICH 1745 via an internal bus (e.g., a unified media interface or a direct media interface). The CPU Processing unit 1730 may contain one or more processors and even may be implemented using one or more heterogeneous processor systems.

Figure 18:
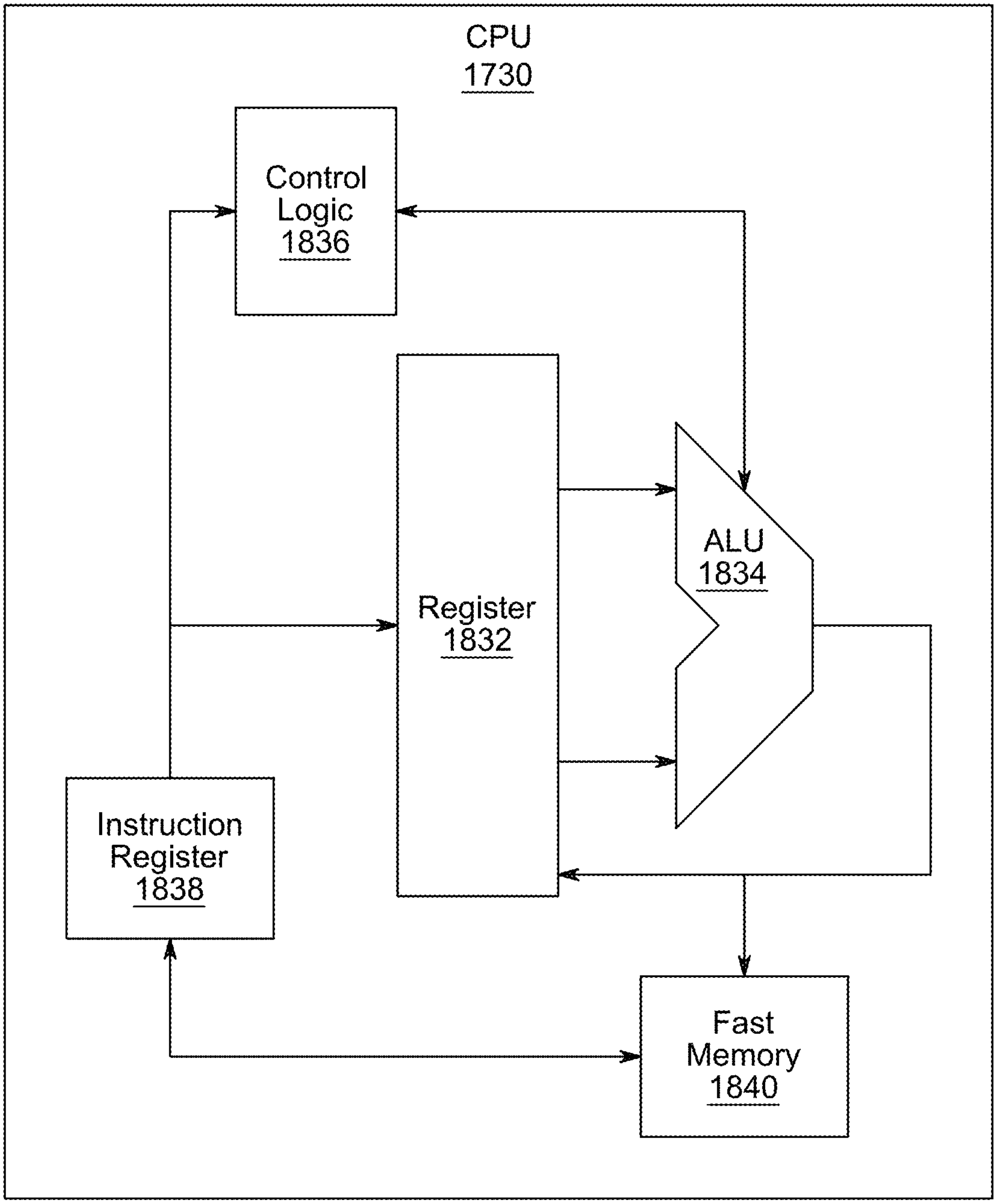
FIG. 18 is an exemplary schematic diagram of a processor used with the computing system, according to certain embodiments.

For example, FIG. 18 shows one implementation of CPU 1730. In one implementation, the instruction register 1838 retrieves instructions from the fast memory 1840. At least part of these instructions is fetched from the instruction register 1838 by the control logic 1836 and interpreted according to the instruction set architecture of the CPU 1730. Part of the instructions can also be directed to the register 1832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1834 that loads values from the register 1832 and performs logical and mathematical operations on the loaded values according to the instructions. The results from these operations can be feedback into the register and/or stored in the fast memory 1840. According to certain implementations, the instruction set architecture of the CPU 1730 can use a reduced instruction set architecture, a complex instruction set architecture, a vector processor architecture, a very large instruction word architecture. Furthermore, the CPU 1730 can be based on the Von Neuman model or the Harvard model. The CPU 1730 can be a digital signal processor, an FPGA, an ASIC, a PLA, a PLD, or a CPLD. Further, the CPU 1730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 17, the data processing system 1700 can include that the SB/ICH 1720 is coupled through a system bus to an I/O Bus, a read only memory (ROM) 1756, universal serial bus (USB) port 1764, a flash binary input/output system (BIOS) 1768, and a graphics controller 1758. PCI/PCIe devices can also be coupled to SB/ICH 1720 through a PCI bus 1762.

The PCI devices may include, for example, Ethernet adapters, add-in cards, and PC cards for notebook computers. The Hard disk drive 1760 and optical drive 1766 can use, for example, an integrated drive electronics (IDE) or serial advanced technology attachment (SATA) interface. In one implementation the I/O bus can include a super I/O (SIO) device.

Further, the hard disk drive (HDD) 1760 and optical drive 1766 can also be coupled to the SB/ICH 1720 through a system bus. In one implementation, a keyboard 1770, a mouse 1772, a parallel port 1778, and a serial port 1776 can be connected to the system bus through the I/O bus. Other peripherals and devices that can be connected to the SB/ICH 1720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 19:
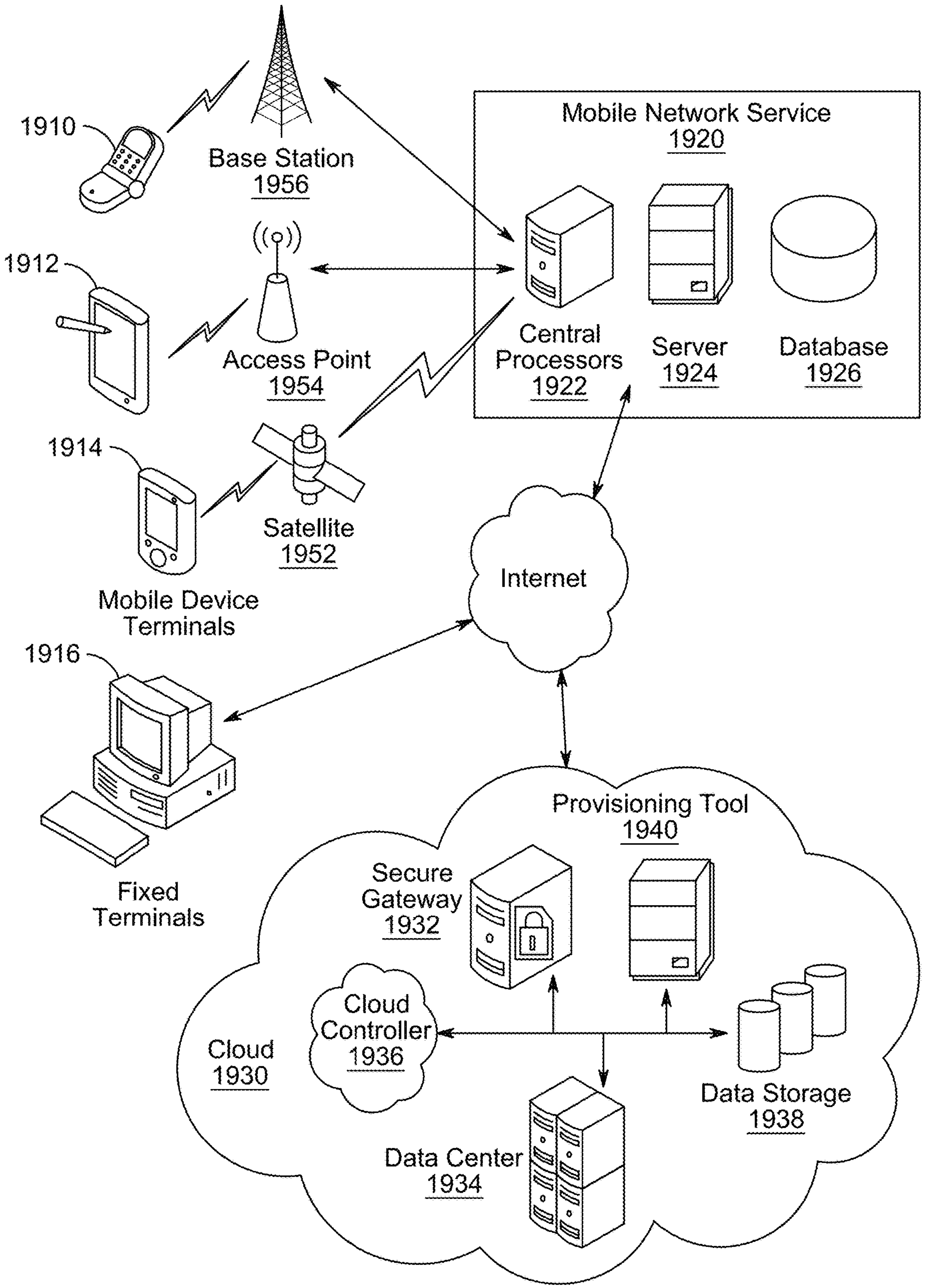
FIG. 19 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1930 including a cloud controller 1936, a secure gateway 1932, a data center 1934, data storage 1938 and a provisioning tool 1940, and mobile network services 1920 including central processors 1922, a server 1924 and a database 1926, which may share processing, as shown by FIG. 19, in addition to various human interface and communication devices (e.g., display monitors 1916, smart phones 1914, tablets 1914, personal digital assistants (PDAs) 1910). The network may be a private network, such as a LAN, satellite 1952 or WAN 1954, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure may be practiced otherwise than as specifically described herein.

The invention claimed is:

1. A hybrid frequency control system for interconnected power grids, comprising:

a 2 degree of freedom model predictive controller (2DoF-MPC) configured to receive area control error (ACE) and load perturbation signals and generate a first control signal based on predictive control algorithms;

a linear active disturbance rejection controller (LADRC) configured to estimate and reject internal and external disturbances in the power grid and generate a second control signal; and a signal combiner configured to combine the first control signal and the second control signal to produce a unified control output for frequency regulation of the interconnected power grid.

2. The hybrid frequency control system of claim 1, wherein the LADRC comprises:

an extended state observer (ESO) configured to estimate system states and disturbances;

a state feedback controller configured to generate control signals based on estimated states; and a disturbance compensation module configured to actively reject estimated disturbances.

3. The hybrid frequency control system of claim 1, wherein the system is configured to control frequency oscillations in a power grid comprising renewable energy sources, energy storage systems, and flexible AC transmission system (FACTS) devices.

4. The hybrid frequency control system of claim 2, wherein the extended state observer (ESO) is configured to estimate both measured and unmeasured disturbances affecting the power grid.

5. The hybrid frequency control system of claim 1, wherein the 2DoF-MPC is configured to process the ACE and load perturbation signals using a prediction horizon and control horizon to optimize future control actions.

6. The hybrid frequency control system of claim 1, wherein the signal combiner is configured to weight the first control signal and the second control signal based on system operating conditions.

7. The hybrid frequency control system of claim 3, wherein the renewable energy sources comprise photovoltaic (PV) systems and wind turbine generators.

8. The hybrid frequency control system of claim 3, wherein the energy storage systems comprise redox flow battery (RFB) systems.

9. The hybrid frequency control system of claim 3, wherein the FACTS devices comprise static synchronous series compensators (SSSC).

10. The hybrid frequency control system of claim 1, wherein the system is configured to operate in a multi-area interconnected power grid with tie-line power flow control.

11. A method for hybrid frequency control in interconnected power grids, comprising:

receiving area control error (ACE) and load perturbation signals from the interconnected power grid;

generating a first control signal using a 2 degree of freedom model predictive control (2DoF-MPC) algorithm that processes the ACE and load perturbation signals;

generating a second control signal using a linear active disturbance rejection control (LADRC) algorithm that estimates and compensates for system disturbances;

combining the first control signal and the second control signal to produce a unified control output; and applying the unified control output to load frequency control systems for frequency regulation of the interconnected power grid.

12. The method of claim 11, wherein generating the second control signal comprises:

estimating system states and disturbances using an extended state observer (ESO);

generating state feedback control signals based on the estimated states; and actively rejecting the estimated disturbances through disturbance compensation.

13. The method of claim 11, wherein the interconnected power grid comprises renewable energy sources, energy storage systems, and flexible AC transmission system (FACTS) devices.

14. The method of claim 11, wherein combining the first control signal and the second control signal comprises weighing each signal based on real-time system operating conditions.

15. The method of claim 12, wherein estimating system states and disturbances comprises observing both internal system dynamics and external load disturbances.

16. The method of claim 11, further comprising optimizing control parameters of the 2DoF-MPC and LADRC based on system performance metrics.

17. A non-transitory computer-readable medium storing instructions that, when executed by a processor, cause the processor to perform operations comprising:

receiving area control error (ACE) and load perturbation signals from an interconnected power grid;

executing a 2 degree of freedom model predictive control (2DoF-MPC) algorithm to generate a first control signal based on the ACE and load perturbation signals;

executing a linear active disturbance rejection control (LADRC) algorithm to generate a second control signal that estimates and compensates for system disturbances;

combining the first control signal and the second control signal to produce a unified control output; and transmitting the unified control output to load frequency control systems for frequency regulation of the interconnected power grid.

18. The non-transitory computer readable medium of claim 17, wherein executing the LADRC algorithm comprises:

implementing an extended state observer (ESO) to estimate system states and disturbances;

generating state feedback control signals based on the estimated states; and performing disturbance compensation to actively reject the estimated disturbances.

19. The non-transitory computer readable medium of claim 17, wherein the operations further comprise controlling frequency oscillations in a power grid comprising renewable energy sources, energy storage systems, and flexible AC transmission system (FACTS) devices.

20. The non-transitory computer readable medium of claim 17, wherein combining the first control signal and the second control signal comprises applying weighting factors to each signal based on current power grid operating condition.

* * * * *